(12) United States Patent
Krishna et al.

(10) Patent No.: US 6,563,837 B2
(45) Date of Patent: May 13, 2003

(54) METHOD AND APPARATUS FOR PROVIDING WORK-CONSERVING PROPERTIES IN A NON-BLOCKING SWITCH WITH LIMITED SPEEDUP INDEPENDENT OF SWITCH SIZE

(75) Inventors: Pattabhiraman Krishna, Marlboro, MA (US); Naimish S. Patel, North Andover, MA (US); Anna Charny, Sudbury, MA (US); Robert J. Simcoe, Westboro, MA (US)

(73) Assignee: Enterasys Networks, Inc., Rochester, NH (US)

( * ) Notice: Subject to any disclaimer, the term of this patent is extended or adjusted under 35 U.S.C. 154(b) by 0 days.

(21) Appl. No.: 09/021,245

(22) Filed: Feb. 10, 1998

(65) Prior Publication Data

US 2001/0050916 A1 Dec. 13, 2001

(51) Int. Cl.[7] ............................................... H04L 12/56
(52) U.S. Cl. ...................... 370/413; 370/415; 370/417
(58) Field of Search ................................. 370/229, 230, 370/231, 389, 395, 412, 413, 414, 417, 418, 428, 429, 395.42, 395.71, 395.4

(56) References Cited

U.S. PATENT DOCUMENTS

| 4,823,338 A | 4/1989 | Chan et al. |
| 4,845,710 A | 7/1989 | Nakamura et al. ........... 370/360 |

(List continued on next page.)

FOREIGN PATENT DOCUMENTS

| EP | 0 404 337 | 12/1990 |
| EP | 0 817 436 A | 1/1998 |
| GB | 2 293 720 | 4/1996 |
| WO | WO 96/08899 | 3/1996 |

OTHER PUBLICATIONS

"A 160–Gb/s ATM Swithcing System using an Internal Speed–up Crossbar Switch," Genda, et al, NTT Network Systems Laboratories, NTT Electronics Technology, Inc., NTT LSI Laboratories, Nov. 28, 1994, pp. 123–133.

"ATM Switch Architectures with Input–Output Buffering: Effect of Input Traffic . . . ," Badran, et al, Computer Networks and ISND Systems, May 26, 1994, Issue No. 9, pp. 1187–1213.

(List continued on next page.)

*Primary Examiner*—Chau Nguyen
*Assistant Examiner*—Soon-Dong Hyun
(74) *Attorney, Agent, or Firm*—Wolf, Greenfield & Sacks, P.C.

(57) ABSTRACT

A switching method and apparatus operates as a work conserving network device. An arbiter using an arbitration algorithm controls a switch fabric interconnecting input ports and output ports. To switch cells, a virtual output queue of an input port is selected that corresponds to an output port with a lowest occupancy rating and a request is sent to this output port. In a greedy version of the algorithm, input ports may send requests to the lowest occupied output port for which they have a cell. In a non-greedy version, requests may only be sent if that input port has a cell for the lowest occupied output port in the entire network device. An output port that receives one or more requests from input ports uses an input port selection algorithm to select an input port from which to receive a packet. After as many input and output ports are matched as is possible in a phase, the packets for those matched ports are transferred across the switch. The switch fabric operates with a speedup of only twice that of the input port data rates and is still work conserving.

41 Claims, 20 Drawing Sheets

OTHER PUBLICATIONS

"Draft Standard P802.10/D7" IEEE Standards for Local and Metropolitan Area Networks: Virtual Bridged Local Area Networks, Oct. 3, 1997, XP002103631.

Anderson T., Owicki S., Saxe J., Thacker C., "High Speed Switch Scheduling for Local Area Networks", Proc. Fifth Internt. Conf. on Architectural Support for Programming Languages and Operating Systems, Oct. 1992, pp. 98–110.

Bennett J. and Zhang H., "WF2Q—Worst–case Fair Weighted Fair Queuing", Proc. IEEE INFOCOM '96.

Chang C–Y et al.: "A Broadband Packet Switch Architecture with Input and Output Queuing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Charny A., "Hierarchical Relative Error Scheduler: An Efficient Traffic Shaper for Packet Switching Networks," Proc. NOSSDAV '97, May 1997, pp. 283–294.

Guerin R. and Sivarajan K., "Delay and Throughput Performance of Speeded–up Input–Queuing Packet Switches," IBM Research Report RC 20892, Jun. 1997.

Liu N. H. et al., "A New Packet Scheduling Algorithm for Input–Buffered Multicast Packet Switches" IEEE Global Telecommunications Conference, Phoenix, Arizona, Nov. 3–8, 1997, vol. 3, Nov. 3–8, 1997, vol. 3, Nov. 3, 1997, pp. 1695–1699, XP000737812 Institute of Electrical and Electronics Engineers.

Mark B. L. et al; "Large Capacity Multiclass ATM Core Switch Architecture" ISS '97, World Telecommunications Congress, (International Switching Symposium), Global Network Evolution: Convergence or Collission? Toronto, Sep. 21–26, 1997, vol. 1, Sep.21, 1997, pp. 417–423 XP0000720547.

McKeown N., "Scheduling Algorithms for Input–Queued Cell Switches," Ph.D.Thesis, Univ. of California, Berkeley, May 1995.

McKeown N., Anatharam V, and Warland J., "Achieving 100% Throughput in an Input–Queued Switch," Proc. IEEE INFOCOM '96, Mar. 1996, pp. 296–302.

McKeown N., Izzard M., Mekkittikul A., Ellersick W. and Horowitz M., "The Tiny Tera: A Packet Switch Core."

McKeown N., Prabahaker B., and Zhu M., "Matching Output Queuing with Combined Input and Output Queuing, "Proc. 35th Annual Allerton Conference on Communications, Control, and Computing, Monticello, Illinois, Oct. 1997.

Parekh, A., "A Generalized Processor Sharing Approach to Flow Control in Integrated Services Networks", MIT, Ph.D. dissertation, Jun. 1994.

Prabhaker B. and McKeown N., "On the Speedup Required for Combined Input and Output Queued Switching," Computer Systems Lab. Technical Report CSL–TR–97–738, Stanford University.

Prabhaker B. et al.: "Multicast Scheduling for Input–Queued Switches" IEEE Journal on Selected Areas in Communications, vol. 15, No. 5, Jun. 1997, pp. 855–866, XP000657037 see paragraph 1.

Stiliadis D. and Varma, A., "Frame–Based Fair Queuing: A New Traffic Scheduling Algorithm for Packet Switch Networks", Proc. IEEE INFOCOM '96.

Zhang L., "A New Architecture for Packet Switched Network Protocols," Massachusetts Institute of Technology, Ph.D. Dissertation, Jul. 1989.

Stiliadis D. and Varma, A., "Frame–Based Fair Queuing: A New Traffic Scheduling Algorithm for Packet Switch Networks", Proc. IEEE INFOCOM '96.

* cited by examiner

U.S. PATENT DOCUMENTS

| | | |
|---|---|---|
| 4,933,937 A | 6/1990 | Konishi ...................... 370/404 |
| 5,018,133 A | 5/1991 | Tsukakoshi et al. |
| 5,138,615 A | 8/1992 | Lamport et al. |
| 5,237,661 A | 8/1993 | Kawamura et al. ........... 710/52 |
| 5,321,693 A | 6/1994 | Perlman |
| 5,367,520 A * | 11/1994 | Cordell ...................... 370/395 |
| 5,394,402 A | 2/1995 | Ross |
| 5,473,599 A | 12/1995 | Li et al. |
| 5,493,566 A * | 2/1996 | Ljungberg et al. .......... 370/231 |
| 5,500,858 A | 3/1996 | McKeown |
| 5,517,495 A | 5/1996 | Lund et al. |
| 5,550,823 A * | 8/1996 | Irie et al. ..................... 370/413 |
| 5,594,732 A | 1/1997 | Bell et al. ................... 370/401 |
| 5,617,421 A | 4/1997 | Chin et al. |
| 5,619,495 A | 4/1997 | Yamanaka et al. |
| 5,621,734 A | 4/1997 | Mann et al. |
| 5,636,215 A | 6/1997 | Kubo et al. ................. 370/397 |
| 5,689,644 A | 11/1997 | Chou et al. |
| 5,734,865 A | 3/1998 | Yu |
| 5,737,528 A | 4/1998 | Konishi |
| 5,768,257 A | 6/1998 | Khacherian et al. ........ 370/229 |
| 5,774,453 A * | 6/1998 | Fukano et al. .............. 370/231 |
| 5,805,816 A | 9/1998 | Pacazo, Jr. et al. ......... 709/223 |
| 5,808,056 A | 9/1998 | Amato et al. |
| 5,838,677 A | 11/1998 | Kozaki et al. |
| 5,859,835 A | 1/1999 | Varma et al. |
| 5,892,766 A | 4/1999 | Wicki et al. |
| 5,892,922 A | 4/1999 | Lorenz |
| 5,959,991 A * | 9/1999 | Hatano et al. .............. 370/395 |
| 5,978,359 A | 11/1999 | Caldara et al. |
| 5,982,771 A | 11/1999 | Caldara et al. |
| 5,982,776 A | 11/1999 | Manning et al. |
| 5,996,019 A | 11/1999 | Hauser et al. |
| 6,052,376 A * | 4/2000 | Wills .......................... 370/419 |
| 6,122,251 A * | 9/2000 | Shinohara ................... 370/231 |
| 6,122,252 A * | 9/2000 | Aimoto et al. .............. 370/235 |
| 6,134,217 A | 10/2000 | Stiliadis et al. |
| 6,144,635 A * | 11/2000 | Nakagawa ................... 370/229 |
| 6,188,690 B1 | 2/2001 | Holden et al. |
| 6,324,165 B1 | 11/2001 | Fan et al. |
| 6,345,050 B1 | 2/2002 | Alleyne |
| 6,377,583 B1 * | 4/2002 | Lyles et al. ............... 370/230.1 |

METHOD AND APPARATUS FOR PROVIDING WORK-CONSERVING PROPERTIES IN A NON-BLOCKING SWITCH WITH LIMITED SPEEDUP INDEPENDENT OF SWITCH SIZE

BACKGROUND OF THE INVENTION

In digital communications systems, data is routinely transmitted between many processing devices over some sort of network. For example, in computer networks, data is typically sent from one computer to another through network communications devices such as hubs, routers, bridges and/or switches interconnected by transmission media or data links. Viewed from the outside, the network communications devices have input and output ports that send and receive data to and from the data links. Within a single network device, data is accepted at input ports, transferred across a switching fabric internal to the network device, and received at output ports for transmission onto the next data link.

The internal switching fabric of a network device interconnects input ports to output ports and is typically controlled by an arbiter. The arbiter typically controls the flow of data from input to output ports, using an arbitration algorithm to sequentially make matches between the ports. The switching fabric then uses the matches to transfer the data once no more matches can be made. The process of an arbiter controlling a switch fabric to interconnect input and output ports is referred to as "switching" the data.

Data transferred between network devices is generally arranged into groups of binary digits (bits) called a packet. A single packet typically contains a header portion including addressing information and a body portion containing the data or payload of the packet. Packets sent between network devices may vary in size. In order to improve the transfer speed of data within a network device, upon arrival, packets are often broken into fixed size blocks of data called cells. The cells are then transported through the network device one by one and then are re-assembled again into a packet before being sent on to the next network device.

Based on the location of buffers, there are generally three classes of data switching architectures implemented in network communication devices, classified based on the location of buffers. The three main data switching architectures are classified as either output buffered (OB), input buffered (IB), or as combined input-output buffered (CIOB) network devices.

In output buffered or shared memory network devices, packets arriving at an input port are placed into output buffers at an output port determined by an address of the packet. In an output buffered network device having N input ports and receiving data at M bits per second, a data transmission rate of N*M is needed for the switch fabric to ensure that data is not lost. Typically, optimal throughput and delay performance is obtained using output buffered network devices.

Advantageously, output buffered network devices can use up to the full bandwidth of outbound data links because of the immediate forwarding of packets into output buffers. The packets are fed to the output data links as fast as the links can accept the packets. Moreover, network devices offer certain latency control features. Packets are always sent onto output data links from the output port in the order received.

A disadvantage of output buffered network devices is that when the switch size and link speeds increase, the switch fabric speed must increase proportionally in order to handle the combined data rates of all input ports being switched to a single output port. Also, memories used as output buffers to store packets must be very fast due to increased switch fabric speeds. As the switch size and the link speeds increase, the cost of output buffered network devices also grows due to the costs inherent in the high speed memory requirements. Thus, current output buffered network devices are limited in size by memory speed technology and cost.

These issues have generated renewed interest in switches with lower cost, such as input buffered switches, despite their deficiencies. One of the most popular interconnection networks for building non-blocking input buffered switches is the crossbar. An input buffered crossbar has the crossbar fabric running at a speedup of 1 (i.e., equal to link rate). If each input port maintains a single FIFO queue, packets suffer from head of line (HOL) blocking. This limits the maximum throughput achievable. To eliminate HOL blocking, virtual output queues (VOQs) have been proposed. Inputs ports with VOQs have a bank of queues, with one queue per output port. Packets are stored in random access buffers at the input ports. However, only pointers to the data need to be stored in the respective VOQs.

Since there could be contention at the input and output ports if more than one input port has data for the same output port, there is a necessity for an arbitration algorithm to schedule packets between various input and output ports. A paper by N. McKeown, V. Anantharam and J. Warland, entitled "Achieving 100% Throughput in an Input-Queued Switch," Proc. INFOCOM, March 1996, pp. 296–302, showed that an input buffered network device with VOQs can provide 100% throughput using a weighted maximum bipartite matching algorithm (defined therein). However, the complexity of the best known weighted maximum matching algorithm is too high for a high speed implementations.

Over the years, a number of maximal matching algorithms have been proposed. Details of these algorithms and the definition of maximal matching may be had with reference to the following papers: T. Anderson, S. Owicki, J. Saxe, C. Thacker, "High Speed Switch Scheduling for Local Area Networks," Proc. Fifth Intl. Conf. On Architectural Support for Programming Languages and Operating Systems, October 1992, pp. 98–110; N. McKeown, "Scheduling Algorithms for Input-Queued Cell Switches," Ph.D. Thesis, Univ. of California, Berkeley, May 1995. However, none of the disclosed algorithms matches the performance of an output buffered network device.

Increasing the speedup of the switch fabric has also been proposed as one of the ways to improve the performance of an input buffered switch. However, when the switch fabric has a higher bandwidth than the links, buffering is required at the output ports too. Thus, a combination input buffered and output buffered network device is required—a CIOB network device (Combined Input and Output Buffered). One goal of such devices is to use a minimum speedup required to match the performance of an output buffered network device using a CIOB and VOQs.

Identical behavior as an output buffered network device means that (a) the CIOB network device is busy at the same time as the emulated network device and (b) the packet departure order is the same. If only (a) is satisfied, then the throughput performance is matched, and if both (a) and (b) are satisfied, then delay performance is also matched. A work-conserving network device will satisfy condition (a). A network device is work conserving if and only if an output port in such a network device is not idle when there is at least one cell at any input port of the network device destined for this output port.

In a network device, a feasible load means that the work entered is not greater than the overall capacity of the network device. For feasible loads, a work-conserving network device guarantees one hundred percent throughput, and thus one hundred percent output data link utilization, assuming that there is only one output data link per output port. For infeasible loads, a work-conserving device guarantees one hundred percent data link utilization for the overloaded data links. Thus, a work-conserving network device eliminates data link idling. This property is very critical for network devices, which are connected to expensive wide area network (WAN) data links where idle link time is expensive.

Another important metric in network devices is fairness. The shared resources in a network device are its output data links. Fairness corresponds to the allocation of the data link capacity amongst the contending entities. The entities could be the input ports, channels or flows that are currently active on this data link.

SUMMARY OF THE INVENTION

Combined input-output buffered network devices have been shown to match the performance of output buffered devices. A paper by N. McKeown, B. Prabahakar, and M. Zhu, entitled "Matching Output Queuing with Combined Input and Output Queuing," (Proc. 35th Annual Allerton Conference on Communications, Control, and Computing, Monticello, Ill., October 1997) the entire contents of which are included herein, shows that a combined input-output buffered network device with VOQs (virtual output queues) can be work-conserving, if the switch fabric speedup of the network device is greater than N/2, where N is the size of the network device measured by the number of input and output ports.

However, known combined input-output buffered network devices with a switch fabric speedup of N/2 are hard to build and still require the expensive high-speed memories noted earlier as the number of ports increases. The best known attempt at configuring a combined input-output buffered network device to match the performance of a work conserving output buffered network device of the same size N uses a speedup of four in the switch fabric with virtual output queues and an arbitration algorithm called Most Urgent Cell First Algorithm (MUCFA). This work has been presented in a paper by B. Prabhakar and N. McKeown, entitled "On the Speedup Required for Combined Input and Output Queued Switching," Computer Systems Lab. Technical Report CSL-TR-97-738, Stanford University.

The MUCFA arbitration algorithm requires the assignment of priorities to cells as they enter the virtual output queues of input buffers at each input port. Generally, MUCFA selects the cells with the highest urgency, typically oldest, for connections to output ports first, hence the name "most urgent cell first". The MUCFA algorithm is cumbersome due to the maintenance required in assigning and updating the priorities of each cell queued at the input ports.

The present invention utilizes a combined input-output buffered network device that can achieve at least some of the performance of the MUCFA system with a speedup of only two. One example configuration of the network device of this invention uses a non-blocking switch fabric, such as a crossbar, operating at a speedup of two. In the invention, a novel arbitration algorithm provides a combined input-output buffered work conserving network device. By reducing the necessary speedup of the switch fabric, lower speed memories are used and thus the network device is scalable to larger numbers of ports while keeping costs to a minimum. Moreover, the arbitration algorithm used in the switching apparatus and method of the present invention uses a lowest occupancy characteristic of output port queues to determine which input port will be paired with which output port when transferring data, and this is generally easier to implement than "urgency" tracking.

The arbitration algorithm of the present invention is called the Lowest Occupancy Output First Algorithm (LOOFA). According to this invention, input ports request transfers with output ports based upon which output port has the lowest occupancy rating (i.e., lowest amount of queued cells or packets) in the output buffers in the output port. After requests are generated for input ports, output ports may then select an input port requesting data transfer according to an input selection algorithm, and "grant" permission for the selected input port to transfer a cell or packet.

With a speedup as low as two in the switch fabric, prioritizing data cell transfers based on an occupancy rating of the output buffers allows the network device to be work conserving and to have advantageous performance features, similar to those of output buffered network devices.

Within the switching method and apparatus of the invention, the input buffers in input ports are arranged into virtual output queues and each virtual output queue corresponds to a distinct output port. Furthermore, the arbiter includes an output buffer occupancy rating detector indicating the occupancy characteristic of the output buffers for a respective output port. An output selector is included in the invention that selects a virtual output queue of an input port corresponding to an output port having the lowest occupancy characteristic. The arbiter may generate a request for the selected output port identifying the requesting input port. An input selector is included as well. The input selector selects an input port to be matched with an output port based upon requests received from the output selector. The input selector then sends a grant to the output selector giving permission for a selected input port to transfer a cell from its virtual output queue corresponding to the output port that sent the grant to that output port.

The arbiter embodies this aspect of the invention in the LOOFA arbitration algorithm. The LOOFA algorithm is executed by the arbiter to make connection matches between input and output ports in the network device.

Also within the invention, there are two versions of the LOOFA arbitration algorithm that control the arbiter, referred to as the non-greedy and greedy versions of LOOFA. In the non-greedy version, the output selector may select a virtual output queue of an unmatched input port only if the virtual output queue corresponds to a single unmatched output port having a lowest occupancy characteristic. The lowest occupancy characteristic, however, is selected from the entire set of all unmatched output ports in the network device as a whole. This is referred to as the non-greedy version of the arbitration algorithm because if a virtual output queue in an input port corresponds to the single lowest occupied output port, but that queue is inactive, no request is made for that output port.

In a greedy version, which is also included in the invention, the output selector may select the virtual output queue of the unmatched input port corresponding to any unmatched output port also having a lowest occupancy characteristic. However, the lowest occupancy characteristic in this version is selected from the set of all unmatched output ports corresponding to any active virtual output queues within the unmatched input port. Thus, in the greedy version, a request will be sent to whichever active virtual output queue has a corresponding output port with a lower occupancy rating. The difference in use between greedy and non-greedy versions of LOOFA affects performance characteristics of the network device.

The above described aspects of the invention may be embodied in hardware, software or a combination of both. Moreover, the method and apparatus may be embodied within the entire network device, or may be contained primarily within the arbiter of the network device which can control the input and output ports and the switch fabric.

As such, the invention provides a novel mechanism of data switching based upon occupancy levels of the individual output port queues in the output ports to which the data cells are to be switched. Using the occupancy level as a guide to switching cells allows the switch fabric to only need a speedup as low as two, while still retaining the work conserving properties. This is advantageous since a slower required speedup allows less expensive processing components to be used in the network device design. Moreover, since the speedup is independent of the number of ports, no matter how many input and output ports are in the network device (i.e., thus determining the size of the network device), the network device is fully scalable without suffering performance loss with increased sizing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
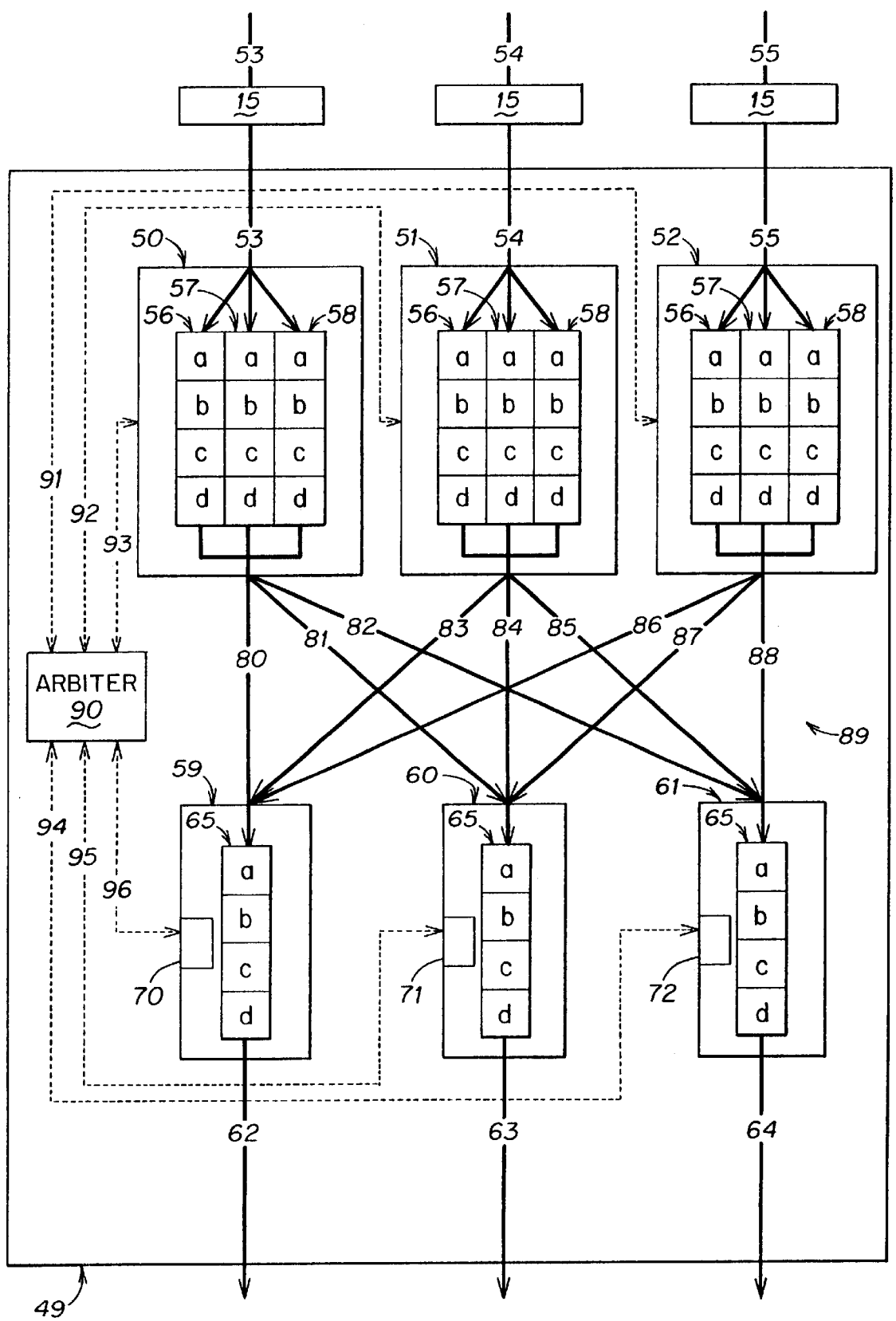
FIG. 1 illustrates the general architecture of a combined input-output buffered network device according to the present invention.

FIG. 1 is an illustration of the main internal components of an example combined input-output buffered network device, as configured according to the present invention. The example network device is a three by three combined input-output buffered (CIOB) network device, since it has three input and three output ports. In the figures used in this description of the invention, a three input by three output combined input-output buffered network device is illustrated for example purposes only. A network device according to the present invention is not limited to using only three input and output port connections and in many common implementation will have many more ports.

Network device 49 comprises three input ports 50, 51 and 52 and three output ports 59, 60 and 61. Each input port 50, 51 and 52 is connected to each output port 59, 60 and 61 via connection channels 80 through 88, which form the switch fabric 89 of the network device 49. The switch fabric 89 is implemented as a crossbar in one embodiment.

In FIG. 1, each input and output port is shown as a separate port. However, typically, a single port in a network device may serve as both an input and output port that is capable of both sending and receiving data over the same physical link. The ports are shown as separate input ports corresponding to separate output ports only for ease of description of the invention. Thus, in a typical crossbar switch fabric for example, each port may selectively connected to all other ports, including itself, in order to transmit data through the network device.

In this example network device, each input port 50, 51 and 52 has virtual output queues (VOQ's) 56, 57 and 58, each containing input buffers "a" through "d" for storing data. Each output port 59, 60 and 61 has an output port queue 65 containing output buffers "a" through "d" for storing data for transmission to output data links 62, 63 and 64, respectively. In actual input/output ports, the buffer sizes may be very large. Only four output buffers and input buffers are shown per queue in each figure due to drawing size limitations.

A network device according to this invention receives data on input ports and sends data from output ports. Typically, the data is received in a standardized format, such as TCP/IP datagrams, frames, or ATM cells for example. These units of data are generally referred to herein as packets for ease of description.

Generally, associated with each input port of a network device in this invention are separate respective virtual output queues, one corresponding to each output port of that network device. As shown in FIG. 1, since there are three output ports 59, 60 and 61, there are three virtual output queues 56, 57 and 58 associated with each input port 50, 51 and 52. If there were ten output ports, there would be ten virtual output queues associated with each input port.

During operation of the network device 49 in FIG. 1, packets containing an address and data arrive at the network device over input data links 53, 54 and 55. As the packets arrive, they are analyzed by a routing algorithm implemented within route processor 30, which makes forwarding decisions based on the address of the packet.

The packets that arrive on an input port may then be divided into fixed size cells by fragmentation processing logic. When packets eventually leave the network device, the cells are reassembled back into a packet at the output port. For simplicity of discussion of this invention, the operation of the method and apparatus is discussed in relation to cells of data, where each cell is a fixed size. However, in a network architecture such as ATM, which already uses fixed size packets, coincidentally referred to as ATM cells, embodiments of the invention may treat the ATM cells the same as the cells within the network device. Thus, in such network architectures, the break down of packets into fixed size cells by a fragmentation process can be avoided.

Each cell is given a header indicating an output port 59, 60 or 61 in the network device to which that cell is to be forwarded. Each cell is then placed into the next available input buffer "a", "b", "c" or "d" in the virtual output queue 56, 57 or 58 within the input port 50, 51 or 52.

The virtual output queue selected to receive the cells of a packet corresponds to the output port 59, 60 or 61 to which that packet is to be sent, as determined by the routing algorithm used in route processor 30. By having a one-to-one correspondence between the number of virtual output queues and the number of output ports, each virtual output queue 56, 57 and 58 is able to buffer the cells that must be transmitted to that virtual output queue's corresponding output port, either 59, 60 or 61, respectively. The process of receiving and queuing cells into the virtual output queues 56, 57 and 58 of each input port 50, 51 and 52 is the input buffering portion of network device processing.

Once the cells are buffered or queued in the virtual output queues, they are ready for transfer to their respective output ports. The operation of cell transfers in network device 49 is controlled by the arbiter 90. In the invention, the arbiter 90 implements the Lowest (or Least) Occupancy Output First Algorithm (LOOFA).

Using LOOFA, the arbiter 90 determines which cells are repetitively removed from the virtual output queues 56, 57 and 58 of each input port 50, 51 and 52 and determines when the cells are transferred across connection channels 80 through 88 and then queued into the output port queues 65 of output ports 59, 60 and 61. The cells remain queued in the output port queues 65 while the network device 49 re-assembles them into packets and unloads the packets onto the respective output data links 62, 63 and 64, according to the speed of those output data links. In this general manner, packets are switched between input and output ports.

One goal of an arbitration algorithm is to allow the arbiter 90 to match as many connections across the network device as possible to maximize throughput. An arbitration algorithm that matches as many connections as possible is a maximal matching algorithm, and achieving a fast arbitration algorithm is similar in nature to the maximal matching problem found in bipartite graphs.

Generally, the LOOFA arbitration algorithm sets-up as many one-to-one connections as possible between input and output ports, and then the arbiter 90 controls the switch fabric 89 to transfer the cells across the network device. This process repeats itself for every cell transfer time slot. By controlling how fast the arbiter 90 executes the arbitration algorithm, the number of cell transfers over time may be controlled. Aside from the physical limitations of the switch fabric, the cell transfer rate controlled by the arbiter's arbitration algorithm determines the speed of the switch fabric. For example, if packets arrive at the network device on input data links at a certain data rate, and the arbiter can control the switch fabric according to the arbitration algorithm to transfer cells for packets at twice that data rate, then the switch fabric is said to have a speedup of two.

Figure 2:
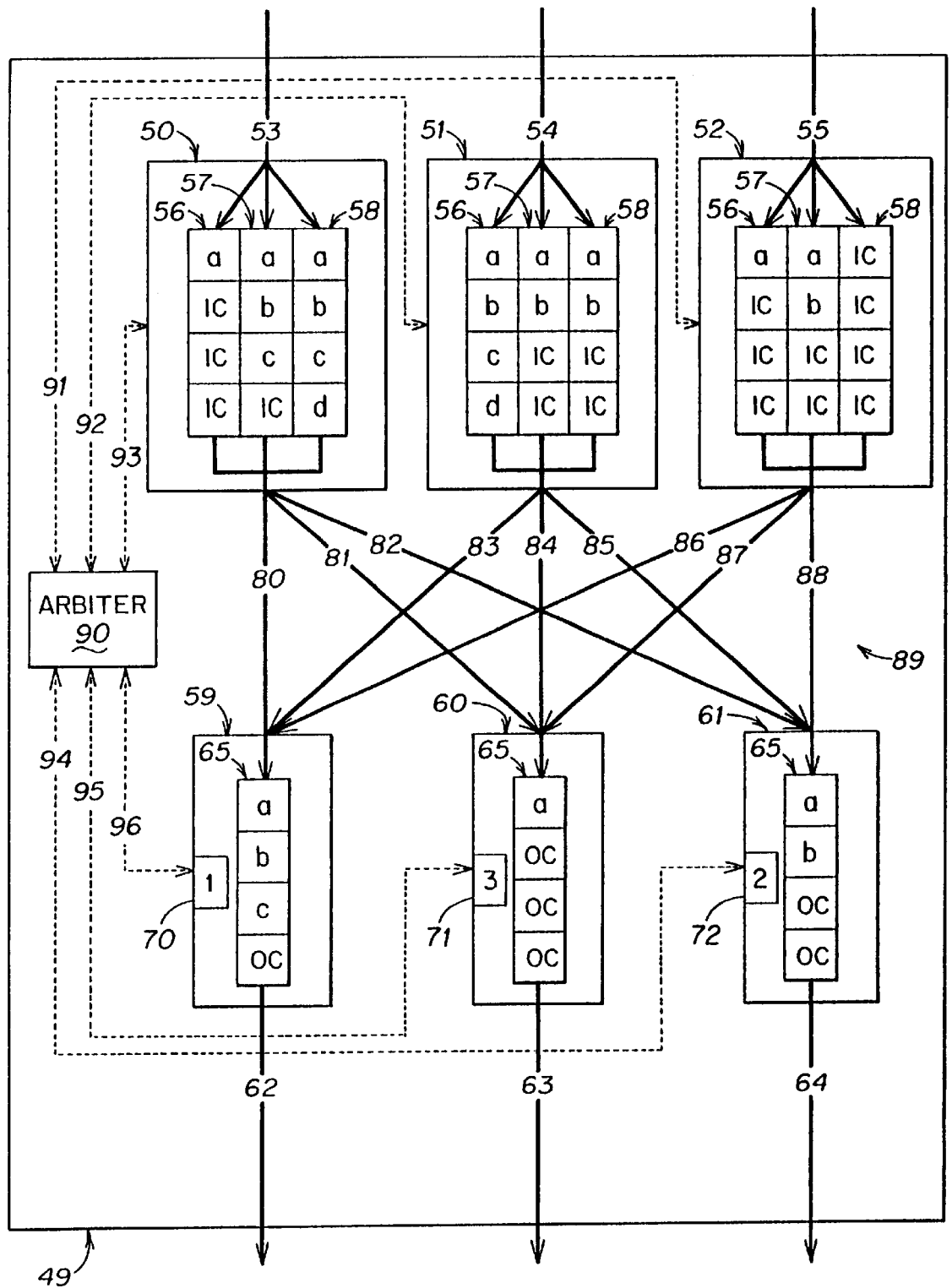
FIG. 2 illustrates an example configuration of a three by three network device showing input (IC) and output (OC) cells queued in the virtual output queues of input ports and in the output port queues of output ports.

FIG. 2 illustrates a snapshot image of network device 49 configured according to the present invention, while processing cells. Queued input cells awaiting transmission across the switch fabric 89 are shown by the letters "IC" in the input buffers of the input ports 50, 51 and 52 that hold each cell. For example, in input port 51, virtual output queue 56 has three input cells (IC's) in respective input buffers (input buffer locations b, c, and d in input port 51 from FIG. 1) awaiting transfer across the connection channel 83 to output port 59. Also in input port 51, virtual output queue 57 has two cells queued (input buffer locations c and d in input port 51 from FIG. 1), each awaiting transfer across connection channel 84 to output port 60. Finally, for input port 51, virtual output queue 58 has two cells queued for transfer over connection channel 85 to output port 61. Input ports 50 and 52 also have cells queued as well, as shown by the input cell (IC) designators in FIG. 2.

As cells get sent from the input ports 50, 51 and 52 across the switch fabric 89, they are queued in the output port queues 65 of their respective output ports, where they await forwarding onto output data links 62, 63 and 64. Queued output cells are shown by the abbreviation "OC" for output cell. The occupancy rating 70, 71 and 72 for each of the output port queues 65 for each output port 59, 60, and 61, is also respectively shown. For example, output port queue 65 in output port 60 has three output cells queued-up for transmission out of network device 49 onto output data link 63. The occupancy rating 71 of output port 60 is therefore shown as three. The occupancy rating 72 of the output buffer 65 in output port 61 is two, since there are two OC cells queued (OC cells queued at output buffer positions c and d from FIG. 1) in this output port. Likewise, the occupancy rating 70 of output port 59 in FIG. 2 is shown as one in this example, since only one OC cell is queued in its output port queue 65. The rate at which packets are dequeued from the output port queues 65 depends upon the data rates of the output data links 62, 63, and 64. "In this draft, it is assumed that the input and output links are of the same capacity."

In the present invention, the occupancy ratings 70, 71 and 72 of the output port queue 65 for each output port 59, 60 and 61 are used, as will be explained, to select appropriate connections for cell transfers. In the example switch configuration of FIGS. 1 and 2, arbiter 90 keeps track of how many OC cells are queued in the output buffers of each output port queue 65 for each output port 59, 60 and 61. In other words, the arbiter maintains the occupancy rating of each output port in the network device. The output queue with the lowest number of OC cells waiting to be sent from the network device is designated within the arbiter 90 as the output port with the least occupancy or lowest occupancy rating. In FIG. 2, output port 59 has the lowest occupancy rating 70 of one, since only one output cell is queued.

The occupancy ratings 70, 71 and 72 are shown in each output port 59, 60 and 61 for ease of description. The invention is not limited to maintaining these occupancy ratings within the output ports or within the arbiter. However, in preferred embodiments, the occupancy ratings are maintained within the arbiter itself.

Figure 19:
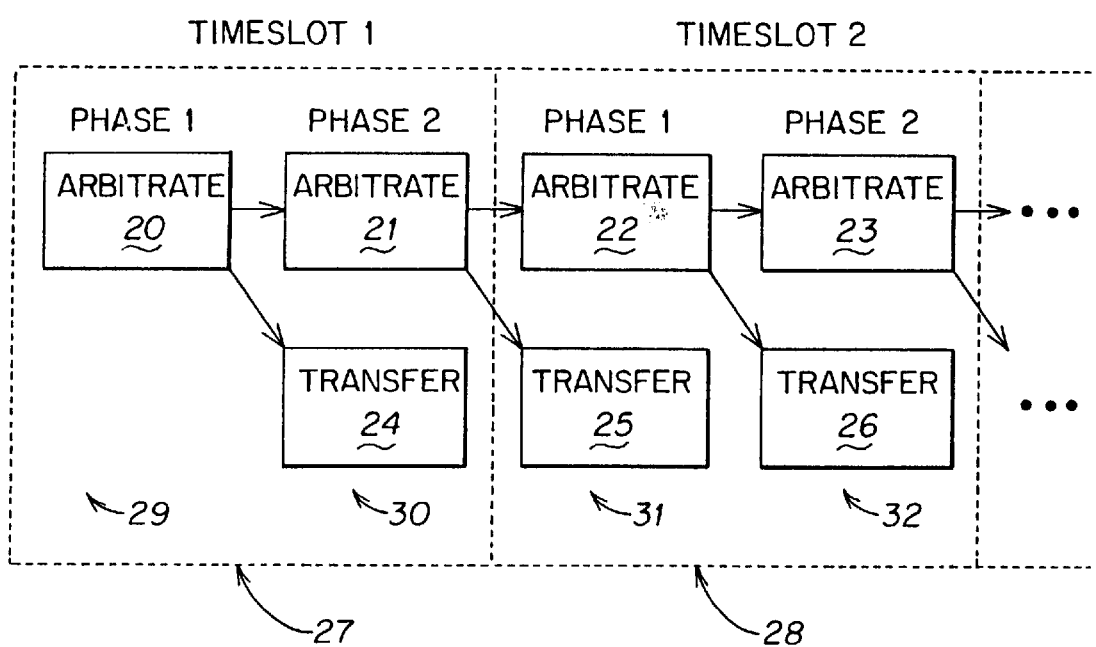
FIG. 19 illustrates an interrelationship between time slots and phases as may occur in the invention so that the switch fabric may have a speedup of two.

As noted previously, the speed at which the LOOFA algorithm operates within the arbiter 90 determines the speed of the switch fabric. In LOOFA, the network device arbitration and cell transfer operation is usually broken into time slots, as illustrated conceptually in the example timing diagram of a network device shown in FIG. 19. It should be noted that LOOFA can be generalized to deeper pipelines, thus obtaining higher throughput. According to this example timing diagram, a single time slot, such as example time slot 27, represents the period of time for the arrival rate of a single cell into one of the virtual output queues of an input port.

In a single time slot according to an embodiment of the invention using this timing diagram, the arbiter running LOOFA can transfer twice as many cells across the switch fabric as the number that arrive at the virtual output queues. Thus, the arbiter operates the switch fabric at a speedup of at least two.

To achieve this, each time slot 27 and 28 is broken into multiple phases 29 and 30, and 31 and 32, respectively. In each phase 29 through 32, arbitration occurs as well as cell transfer. Arbitration, illustrated by processing blocks 20 through 23 in FIG. 19, refers to the setup of connections between input and output ports. Cell transfer, illustrated by processing blocks 24, 25 and 26, is the process of actually transferring the cells across the switch fabric of the network device between the input and output ports.

Accordingly, a phase defines the period of time in which as many input and output ports are matched as possible (arbitration) while at the same time, one group of cell transfers takes place (transfer) for connection matches made in the previous phase. For example, during the initial phase 29 of network device operation, only the first arbitration 20 takes place as input-output port connections are initially setup. After that, in each successive phase 30, 31, 32, etc., cell transfers take place (transfers 24, 25, 26, etc.) for the connections that were established in the previous phase, while at the same time, arbitration takes place (arbitrate blocks 21, 22, 23, etc.) in order to set up the next group of connections to be transferred in the next phase, as indicated by the arrows in FIG. 19.

Thus, arbitration and cell transfer occur in parallel with each other in a phase. Since two phases occur in each time slot, two cells are transferred from each input port, one cell in each phase, for every one that arrives at the input port in a single time slot. Two phases per time slot thus provides a speedup of two in the switch fabric.

Within a single arbitration process (20 through 23) of a phase, multiple iterations of LOOFA occur. One iteration of a phase is one attempt by the arbiter running LOOFA to match as many input port virtual output queues with output ports. More specifically, an iteration of the arbitration portion of a phase is one output selection process followed with one input selection process. It may take multiple iterations of LOOFA until no more matches can be made between input and output ports, at which point the arbitration portion of that phase is complete. The cell transfer portion occurs simultaneously with arbitration.

Conceptually, the general operation of a phase of the arbiter running LOOFA according to this invention comprises the following five steps:

Step 1. Initially, all input ports and output ports are unmatched.

Step 2. Each unmatched input port selects the virtual output queue going to an unmatched output port with the lowest occupancy rating, and generates a request for that output port. (Output Selection)

Step 3. The output port(s), upon receiving requests from one or more input port(s), selects one input port according to an input selection algorithm, and generates a grant for that input port. (Input Selection)

Step 4. Repeat steps 2 and 3 until no more matches may be made between any input and output ports. (Perform multiple iterations until all ports matched)

Step 5. Transfer cells to complete this phase and repeat entire process beginning at Step 1.

Each execution of steps 1 through 5 in the arbiter occurs within one cell transfer phase to define the state of the switch fabric for the next cell transfer phase. In the present invention, at least two phases are executed in a time slot, where a time slot is measured by the maximum arrival rate of cells at the top of the virtual output queues of the input ports. Accordingly, by executing LOOFA twice in one time slot, a speedup of two is realized in the switch fabric, thus potentially transferring twice as many cells across the switch fabric as can arrive at the virtual output queues of the input ports. LOOFA is optimal in terms of attainable speedup. That is, generally, a speedup of two is necessary and sufficient to provide the work conserving property when using LOOFA.

Figure 20:
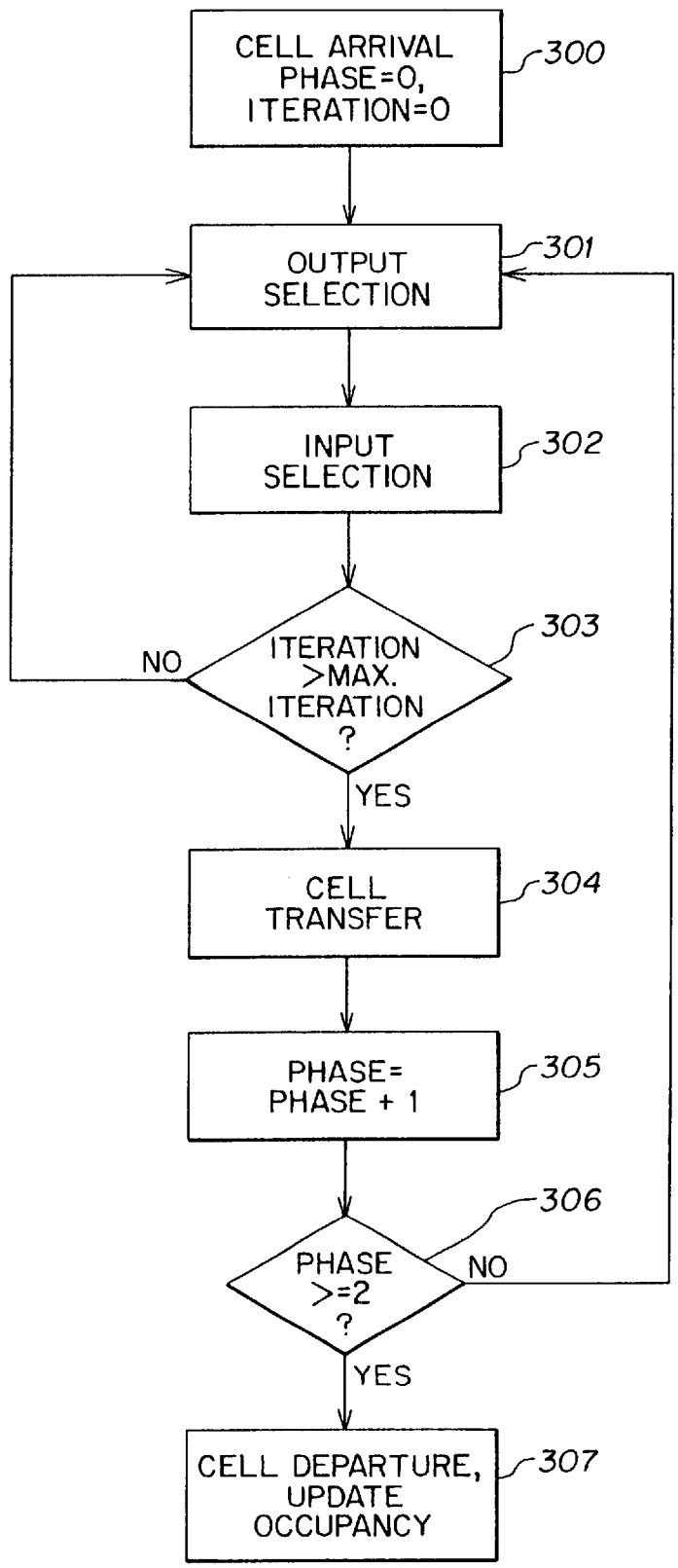
FIG. 20 illustrates a flow chart of the processing steps generally performed during a two phased time slot execution of LOOFA.

FIG. 20 illustrates the general processing steps performed by the network device during each time slot. As shown in FIG. 20, in step 300, the cell arrives at an input port and phase and iteration variables are initialized to zero. Then, in steps 301 and 302, the output and input selection processes take place, which are equivalent to steps 2 and 3 of LOOFA, as discussed above. Step 303 then determines if the iteration counter has exceeded the maximum iterations. If the maximum number of iterations has not been exceeded, steps 301 and 302 are repeated. If the maximum iterations of output and input selection have taken place, step 304 transfers the cells across the switch fabric and step 305 increments the phase counter (i.e., from zero to one in the first phase). Then, in step 306, if the phase counter is less than two, which it will be during the first phase, steps 301 through 305 are repeated for the second phase. If the phase counter is equal to or greater than 2, then step 307 is processed at which point cell departures from the network device occur and the occupancy of the output ports is updated. Accordingly, in each phase of LOOFA, a cell transfer takes place, and in a time slot, a cell departure from the output port buffer takes place.

There are two variations of the general LOOFA algorithm stated above and in steps 1 through 5. The two versions of LOOFA are referred to as greedy and non-greedy. The greedy and non-greedy distinction is made in the output selection process (Step 2), and affects which input ports are "allowed" to make requests to output ports.

Figure 3:
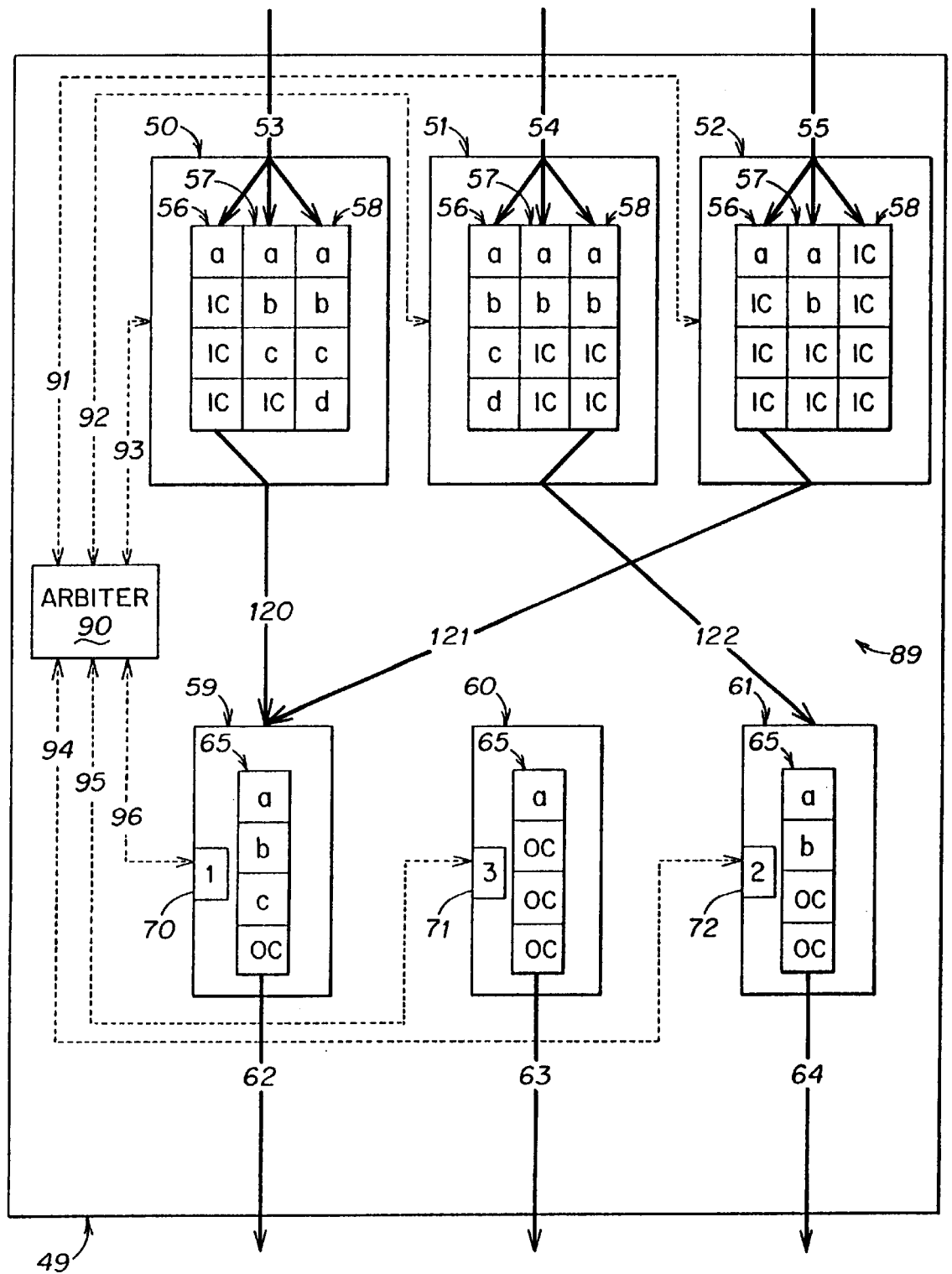
FIG. 3 illustrates an example of greedy output selection requests made in the first iteration of the greedy version of the LOOFA algorithm.

To illustrate an example operation of LOOFA and to highlight the distinctions between the greedy and non-greedy versions, reference is made to FIGS. 3 through 13 which are abstracted as requests and grants between ports. Requests and grants, such as request 120 for example in FIG. 3, are shown by arrows in the figures, but, depending upon implementation details, embodied in a single variable setting or a message, for example, sent between functions within the arbiter 90 itself.

FIG. 3 conceptually shows greedy LOOFA requests. In greedy LOOFA, if any input port has any cells queued in any virtual output queue, indicating that those virtual output queues are active, the arbiter 90 can generate a request for that input port in the current iteration of the phase. More specifically, the request will be generated for the output port that has the lowest occupancy rating corresponding to one of the active virtual output queues in that input port.

Hence, in greedy LOOFA, all input ports with at least one active virtual output queue will cause a request to be generated, even if none of the active virtual output queues happen to correspond with the single output port having the lowest occupancy rating across the switch.

In the example in FIG. 3, request 120 is shown being generated from virtual output queue 56 in input port 50 to output port 59, since when selecting between the only two active virtual output queues 56 and 57 in input port 50, the arbiter 90 determines that virtual output queue 56 corresponds to output port 59 that has the lower occupancy rating between the two (occupancy ratings 70 and 71, having ratings of one and three, respectively, as shown in FIG. 3). Likewise, request 121 is drawn from virtual output queue 56 in input port 52 to output port 59, since when choosing between all three active virtual output queues 56, 57 and 58 in input port 52, the arbiter 90 always generates the request for the active virtual output queue corresponding to the unmatched output port having the lowest occupancy rating. That is, since in input port 52, every virtual output queue 56, 57 and 58 is active (all have outgoing cells OCs), each output port 59, 60 and 61 is available to receive a request, but the arbiter 90 only selects the output port associated with the active virtual output queues having the lowest occupancy rating, which is output port 59 having occupancy rating 70 of one) in this example. Thus, for the first iteration of the current phase, greedy LOOFA generates requests 120, 121 and 122.

Figure 4:
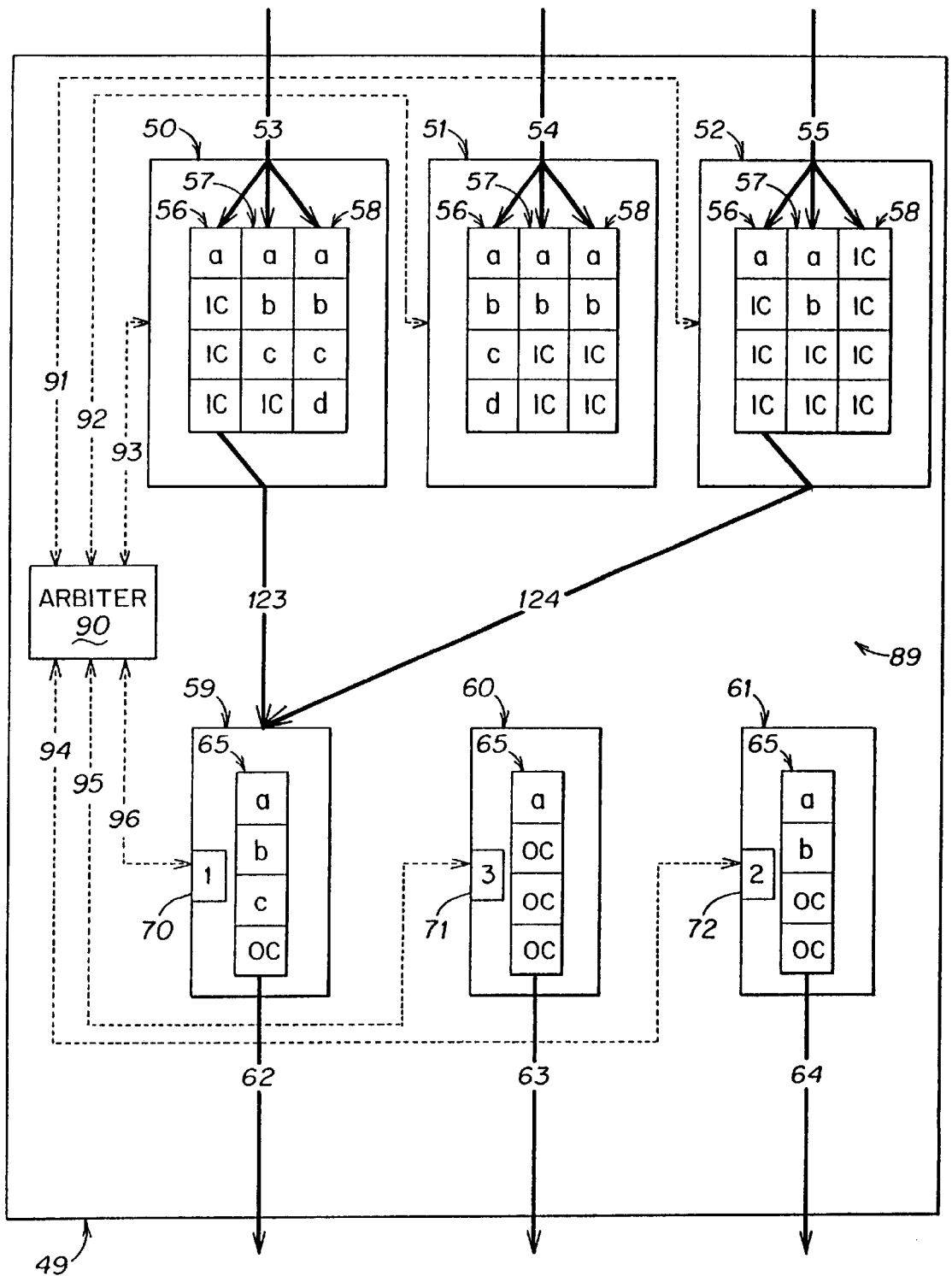
FIG. 4 illustrates an example of non-greedy output selection requests made in the first iteration of the non-greedy version of the LOOFA algorithm.

FIG. 4 illustrates the distinction between greedy and non-greedy versions of LOOFA. In FIG. 4, an arbiter 90 running the non-greedy LOOFA algorithm only makes a request from an unmatched input port during an iteration of a phase if that input port's virtual output queue corresponding to the lowest occupancy unmatched output port is active. Thus, as drawn FIG. 4, only unmatched input ports 50 and 55 prompt the generation of requests 123 and 124, each associated with the respective virtual output queue 56, since only within these input ports is virtual output queue 56 active, which corresponds to unmatched output port 59, having the lowest occupancy rating of all unmatched output ports. In the non-greedy request example in FIG. 4, input port 51 does not make a request, since virtual output queue 56 in input port 51 is inactive, having no cells to send.

After the greedy and non-greedy requests of FIGS. 3 and 4 have been made, step 2 of LOOFA, output selection, is complete. Once some or all of the unmatched output ports have received one or more associated requests and output selection is over, those unmatched output ports are then matched to a requesting input port via the input selection process. As shown in both the greedy and non-greedy versions of LOOFA in FIGS. 3 and 4, certain unmatched output ports may happen to have more than one associated request, indicating that more than one unmatched input port has IC cells for that output port. The arbiter 90 determines, during input selection, which input ports get paired and hence matched with which output ports during this iteration of the current phase. This is conceptually done in the figures by showing the output ports "sending" a grant to the chosen input port, as shown in FIGS. 5 and 6, which correspond to FIGS. 3 and 4, respectively.

Figure 5:
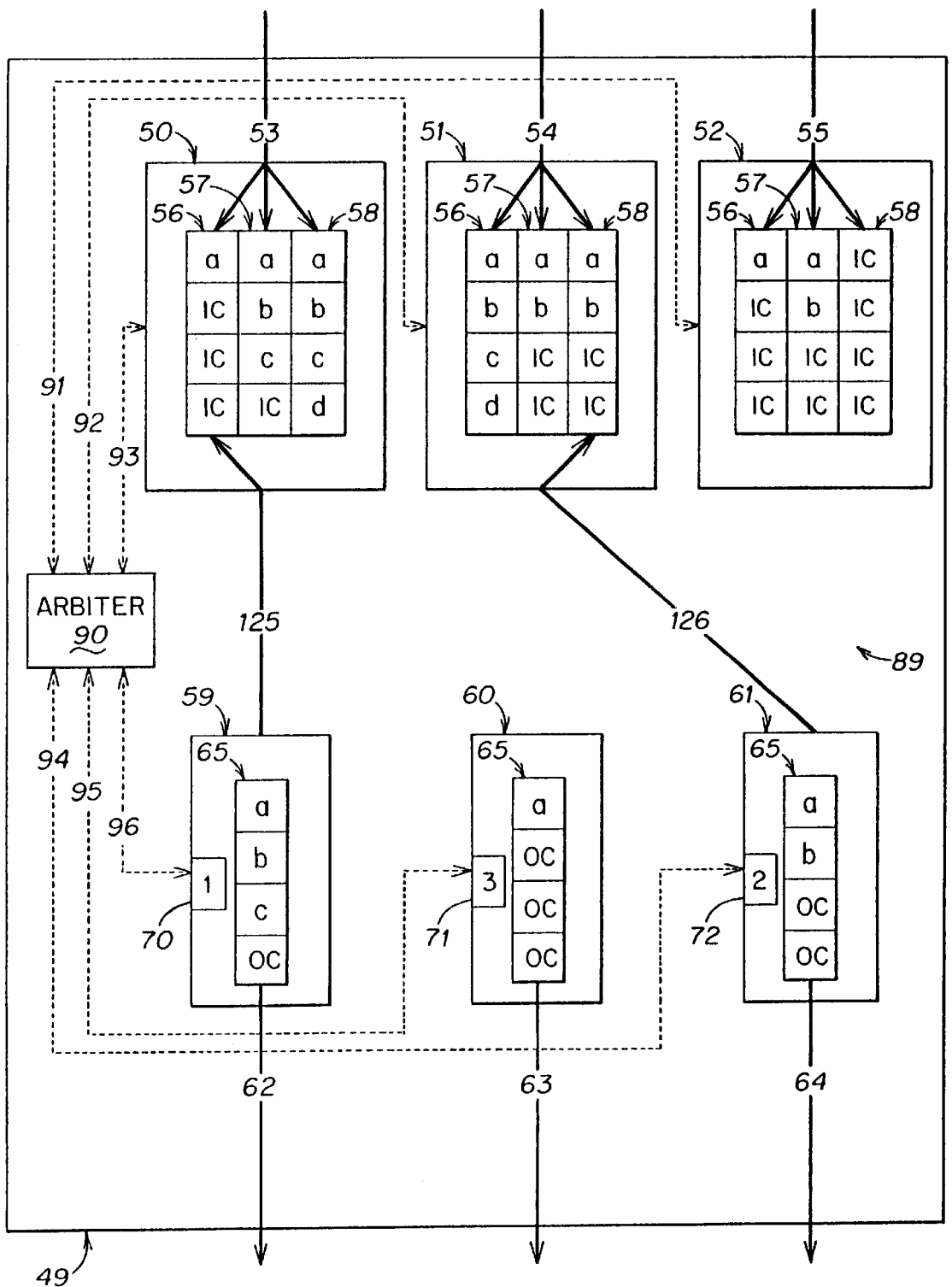
FIG. 5 illustrates greedy input selection grants made in the first iteration of the greedy version of the LOOFA algorithm, in response to the requests made in FIG. 3.

FIG. 5 shows the results of the greedy input selection process (Step 3 of LOOFA), based upon the requests generated in the previous description of FIG. 3. Since unmatched output port 61 in FIG. 3 received only one request from input port 51, the input selection process of step 3 of LOOFA will match these two ports without complication. However, since in FIG. 3, unmatched output port 59 received two requests, one each from input ports 50 and 52, the arbiter 90 must decide which request 120 or 121 will receive a corresponding grant. In other words, the arbiter must decide which input port 50 or 52 will be allowed to transfer its cell to output port 59 in this phase. The decision marks the pairs of input and output ports as matched, and removes them from consideration in the next iteration, as will be explained.

The arbiter makes the input selection decision for an output port receiving multiple requests based on an input selection algorithm. Various input selection algorithms may be used, such as a circular round-robin selection algorithm, a Last Service Time algorithm, or an Oldest Cell First algorithm, or others. In FIG. 5, the arbiter 90, according to the input selection algorithm in use, matches output port 59 with requesting input port 50 as shown by grant 125, and matches output port 61 with requesting input port 51 via grant 126. Once all matches are made, the iteration is over. Thus, after the first iteration of the greedy version of LOOFA, two pairs of input and output ports are matched. Greedy LOOFA is called "greedy" since more than one pair of ports may be matched in an iteration of a phase.

Figure 6:
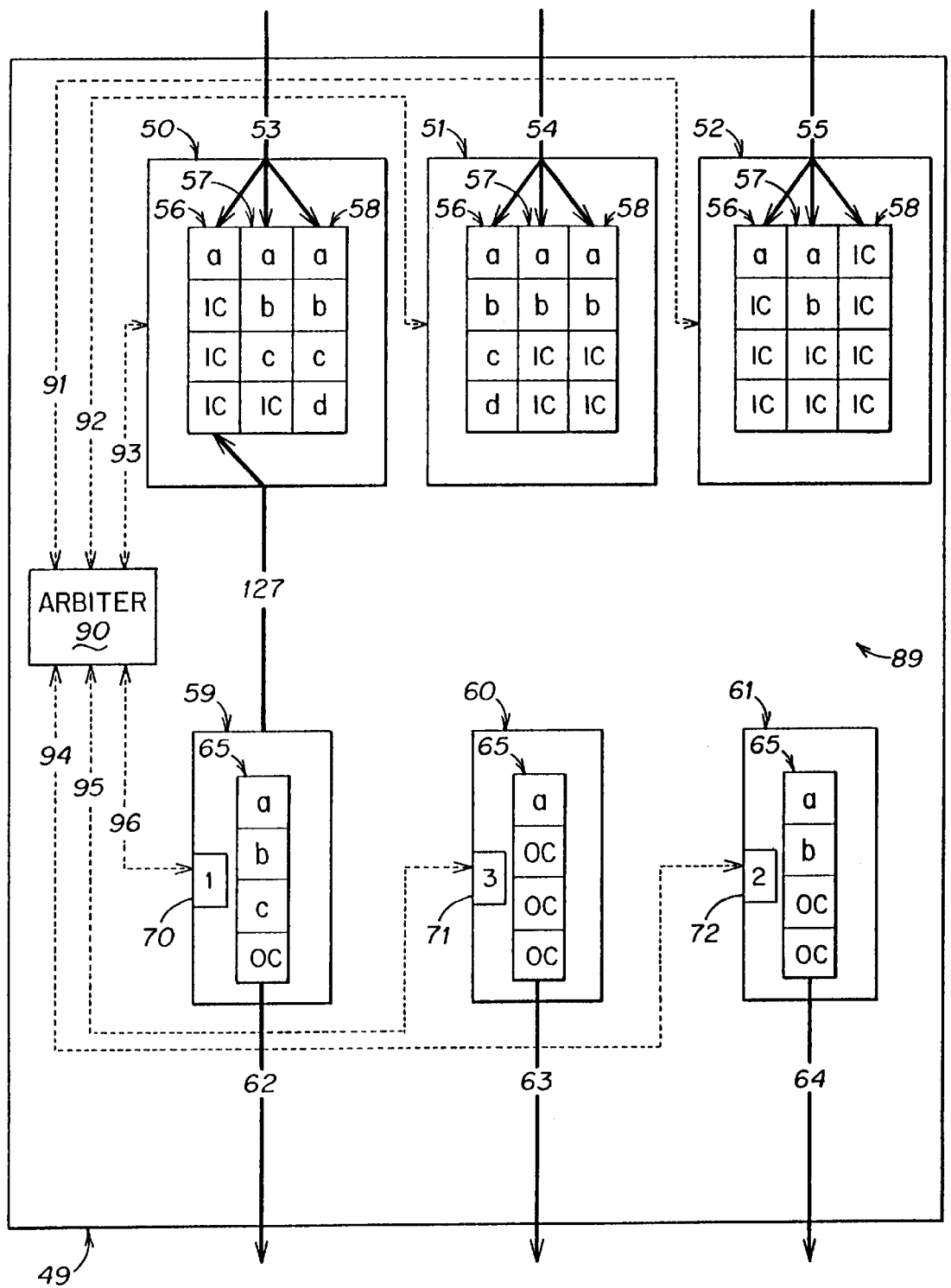
FIG. 6 illustrates non-greedy input selection grants made in the first iteration of the non-greedy version of the LOOFA algorithm, in response to the requests made in FIG. 4.

FIG. 6 shows the matching performed by the non-greedy version of LOOFA (also Step 3 of LOOFA), based upon the example non-greedy requests illustrated in example FIG. 4. As in the greedy input selection process explained above, the non-greedy input selection process is similar. However, remember that during the non-greedy output selection process (Step 2), the only output port to ever receive requests in any one iteration is the one singular unmatched output port having the lowest occupancy rating across the switch. Thus, during the non-greedy input selection process (step 3), the only output port that needs to grant permission to a requesting input port to transmit a cell is the lowest occupancy output port. The decision is still performed with an input selection algorithm however.

In the example non-greedy requests shown in FIG. 4, output port 59 had the lowest occupancy rating and received all of its requests from input ports having cells destined for this unmatched output port. Accordingly, in FIG. 6 showing the non-greedy grants generated in response to the requests of FIG. 4, only input port 50 is matched with output port 59, as shown by grant 127. Once all the ports are paired or matched at the end of the iteration, those ports are removed from further output and input selection iterations by being marked as matched.

After steps 2 and 3 of LOOFA have been processed for one iteration in either the greedy and non-greedy versions of LOOFA, steps 2 and 3 are repeated for that version of LOOFA via step 4, until no more input and output ports may be matched. Note that typically, at each iteration in both the greedy and non-greedy versions, the number of unmatched input and output ports diminishes. For example, in one iteration of non-greedy output and input selection, only the lowest occupancy output port will receive one or more requests and will be matched with one of the requesting input ports. Then, during the next iteration, this input and output port pair is not used in either selection process since it was previously marked as matched. Accordingly, some other unmatched output port will be the one with the lowest occupancy rating for the next iteration and will receive requests from unmatched input ports and then will select one requesting input port with which to be matched. The iterations in both versions repeat until no more matches may be made.

Figure 11:
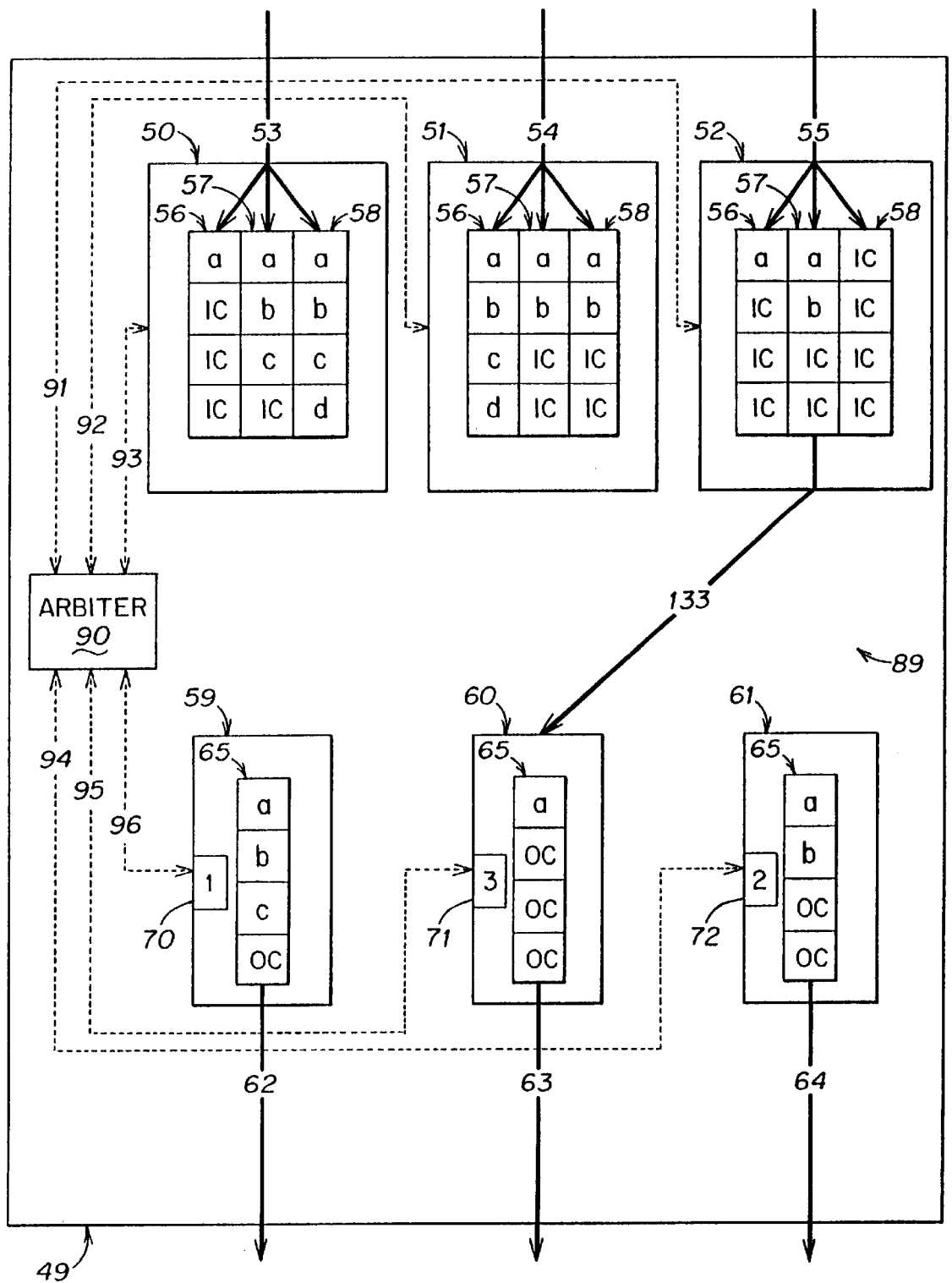
FIG. 11 illustrates an example of non-greedy output selection requests made in the third iteration of the non-greedy version of the LOOFA algorithm.
Figure 12:
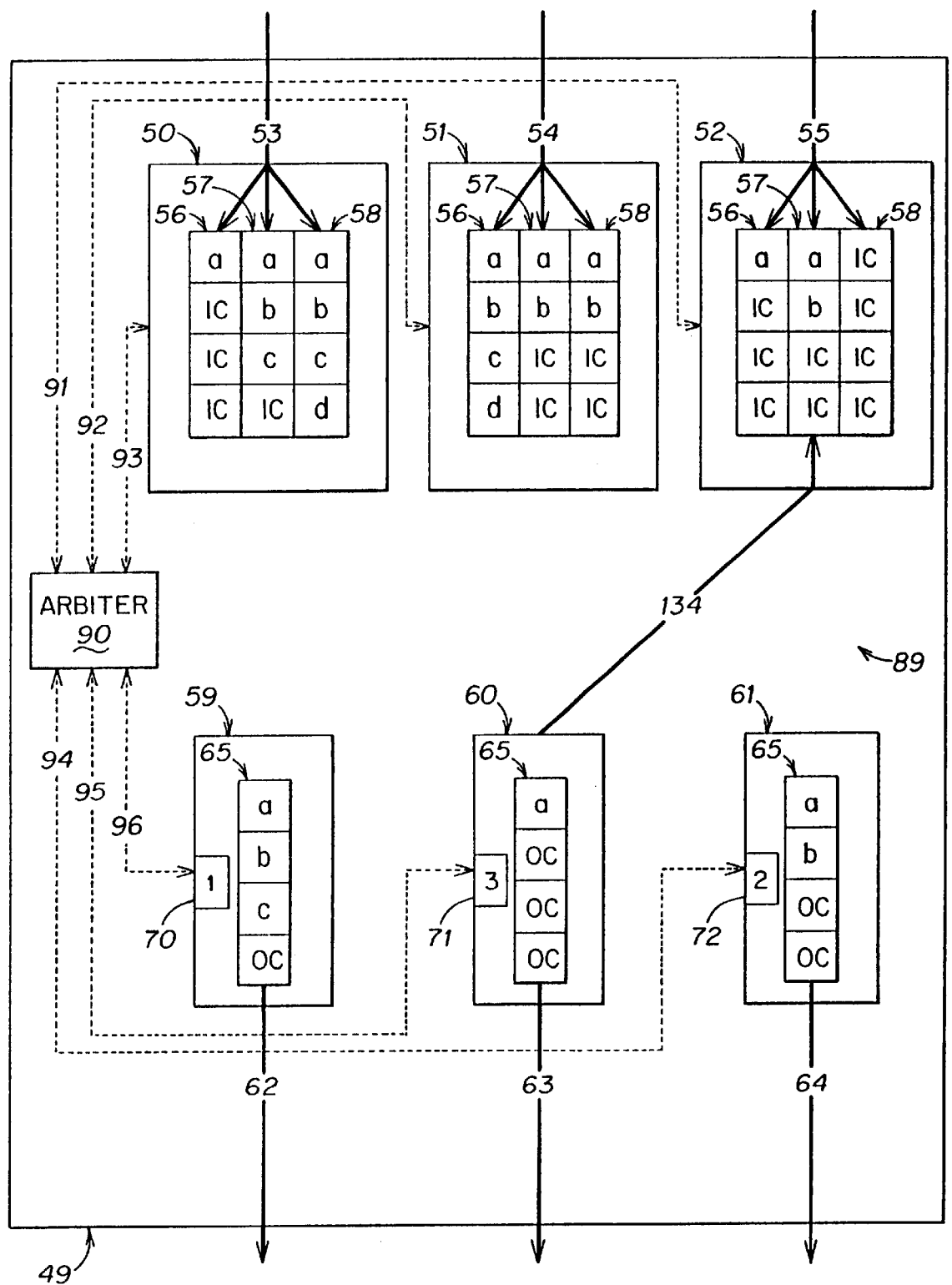
FIG. 12 illustrates non-greedy input selection grants made in the third iteration of the non-greedy version of the LOOFA algorithm, in response to the requests made in FIG. 11.
Figure 13:
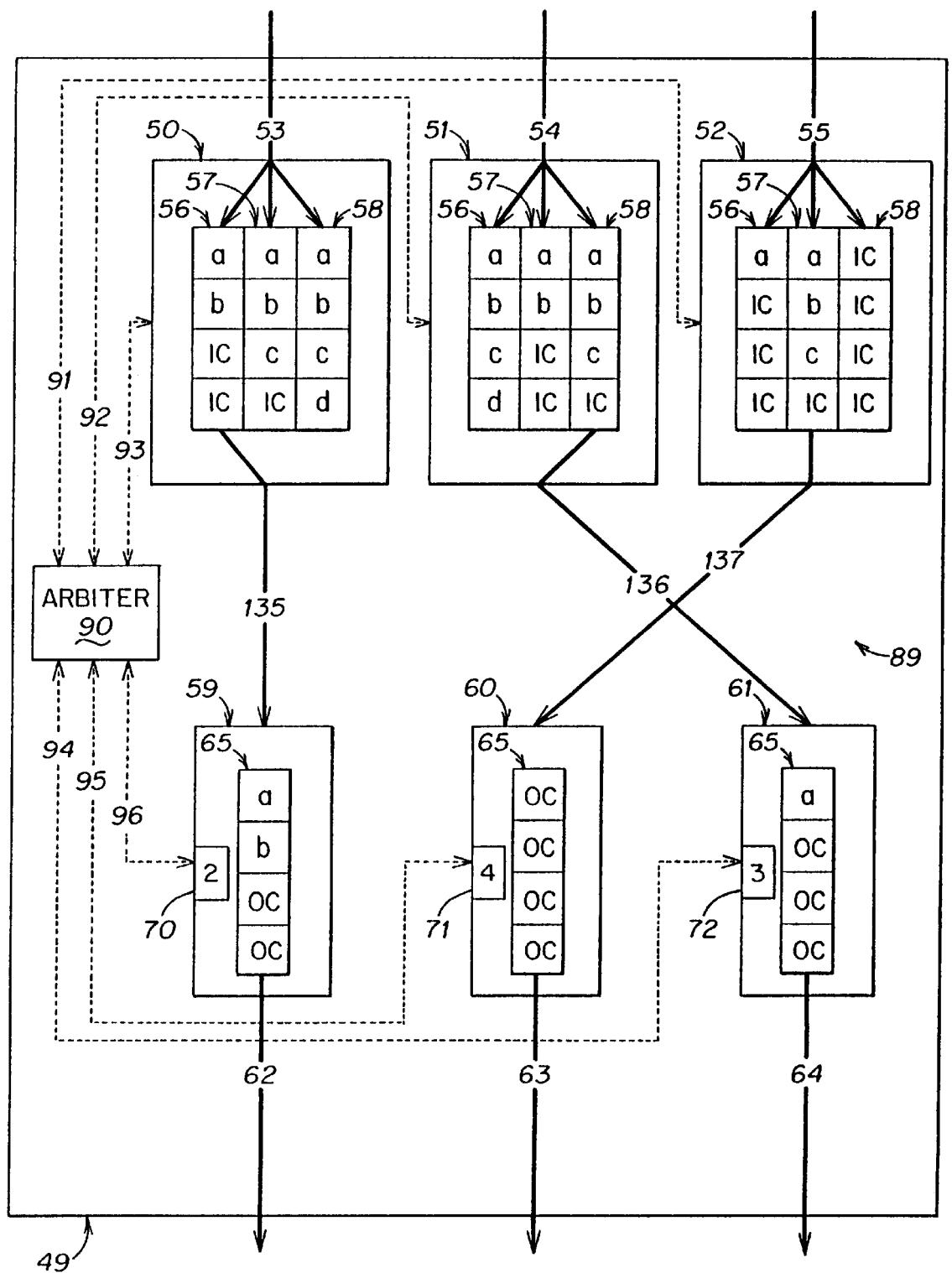
FIG. 13 shows the cell transfers that take place at the end of the example phase after the successive iterations of both the greedy and non-greedy versions of LOOFA shown in FIGS. 3 through 12.

For completeness, FIGS. 7 through 13 illustrate the remaining iterations of both the greedy (FIGS. 7 and 8) and non-greedy (FIGS. 9 through 12) LOOFA examples. FIG. 13 shows the cell transfers that take place after all matches have been made according to both versions of LOOFA.

Figure 7:
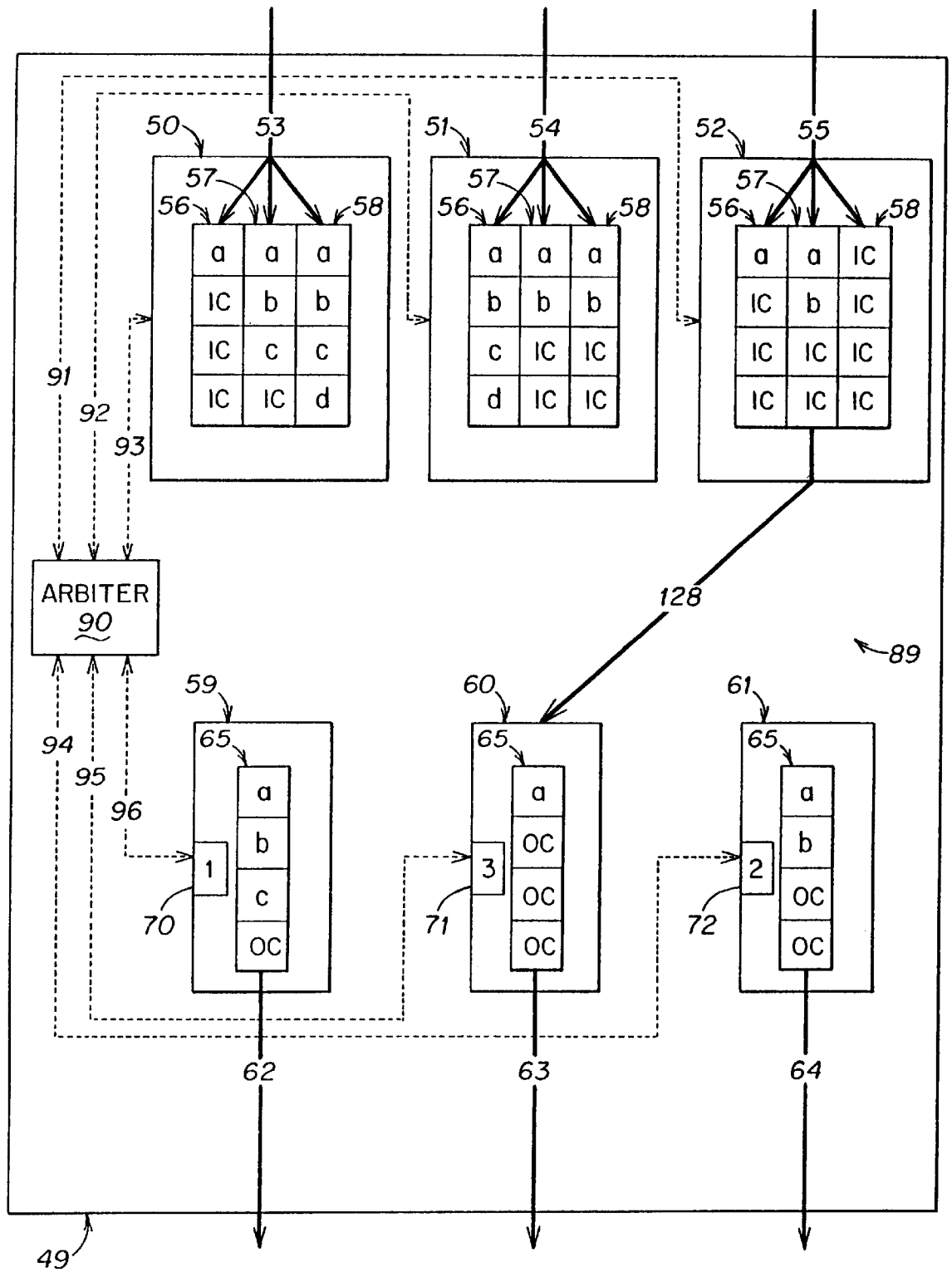
FIG. 7 illustrates an example of greedy output selection requests made in the second iteration of the greedy version of the LOOFA algorithm.
Figure 8:
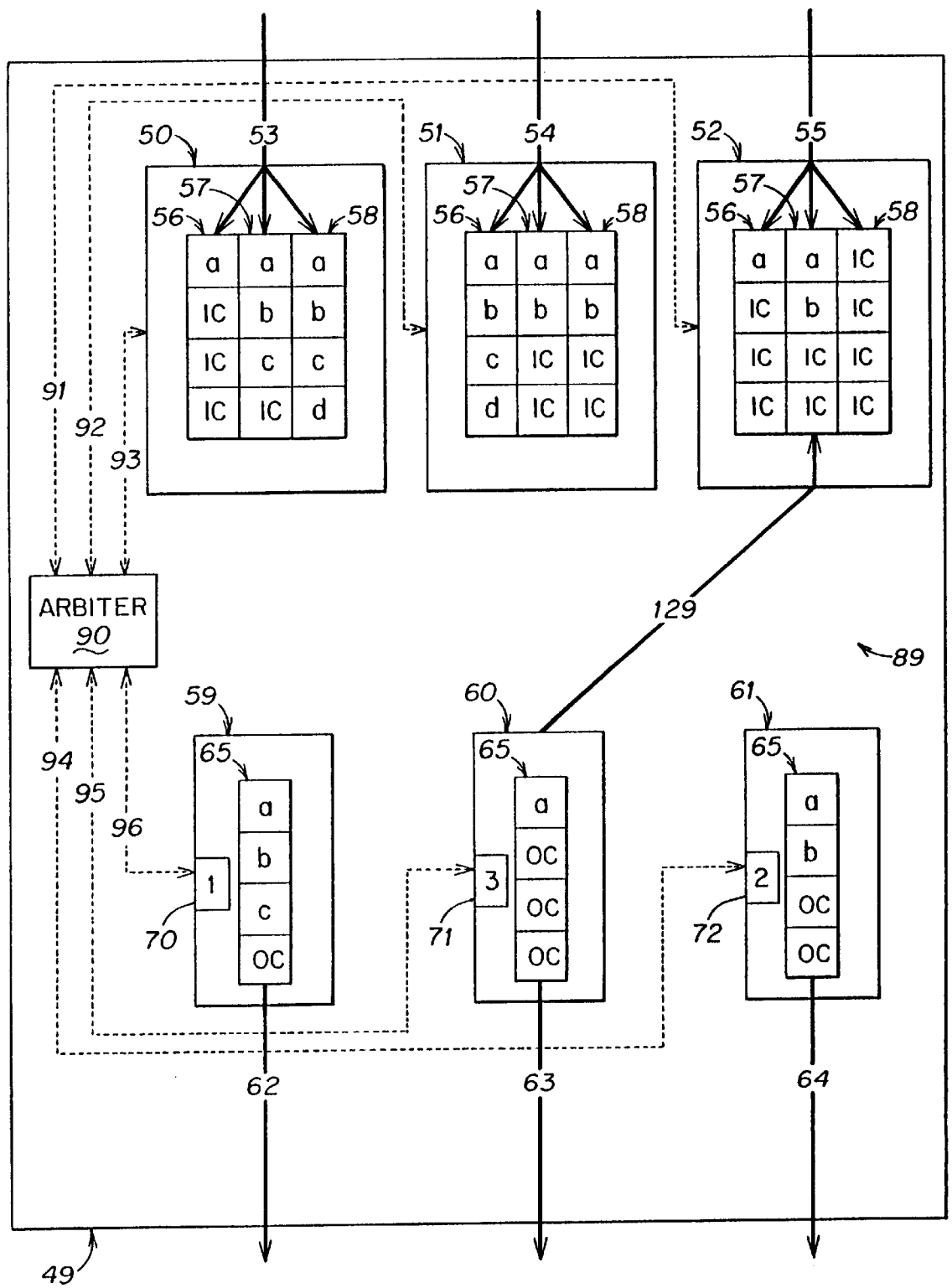
FIG. 8 illustrates greedy input selection grants made in the second iteration of the greedy version of the LOOFA algorithm, in response to the requests made in FIG. 7.

In FIG. 7, the second iteration of greedy requests (step 2 of LOOFA) is shown. Since in FIG. 5, input ports 50 and 51 were respectively matched with output ports 59 and 61, the only remaining unmatched input and output ports remaining in FIG. 7 are input port 52 and output port 60. Since input ports 52 has at least one cell waiting in virtual output queue 57 (i.e., virtual output queue 57 is active) which corresponds to output port 60 and output port 60 has the lowest occupancy rating of any remaining unmatched output ports, the arbiter generates request 128, as illustrated from input port 52 to output port 60. In FIG. 8, illustrating the second iteration of greedy input selection grants (step 3 of LOOFA), input port 52 is granted permission to send its cell to output port 60 by the arbiter 90 according to the input selection algorithm, as shown by grant 129. At this point in greedy LOOFA, after the grant in FIG. 8 is processed, all input and output ports have been matched, and the end of the phase (step 5) will be processed, as will be explained shortly.

FIGS. 9 through 12 show the remaining output and input selection steps for the remaining iterations of the non-greedy LOOFA algorithm, as last discussed with respect to FIG. 6. Since in FIG. 6, output port 59 granted input port 50 permission to transfer a cell, these two ports were matched. Hence, in FIG. 9, only input ports 51 and 52 and output ports 60 and 61 remain unmatched.

Figure 9:
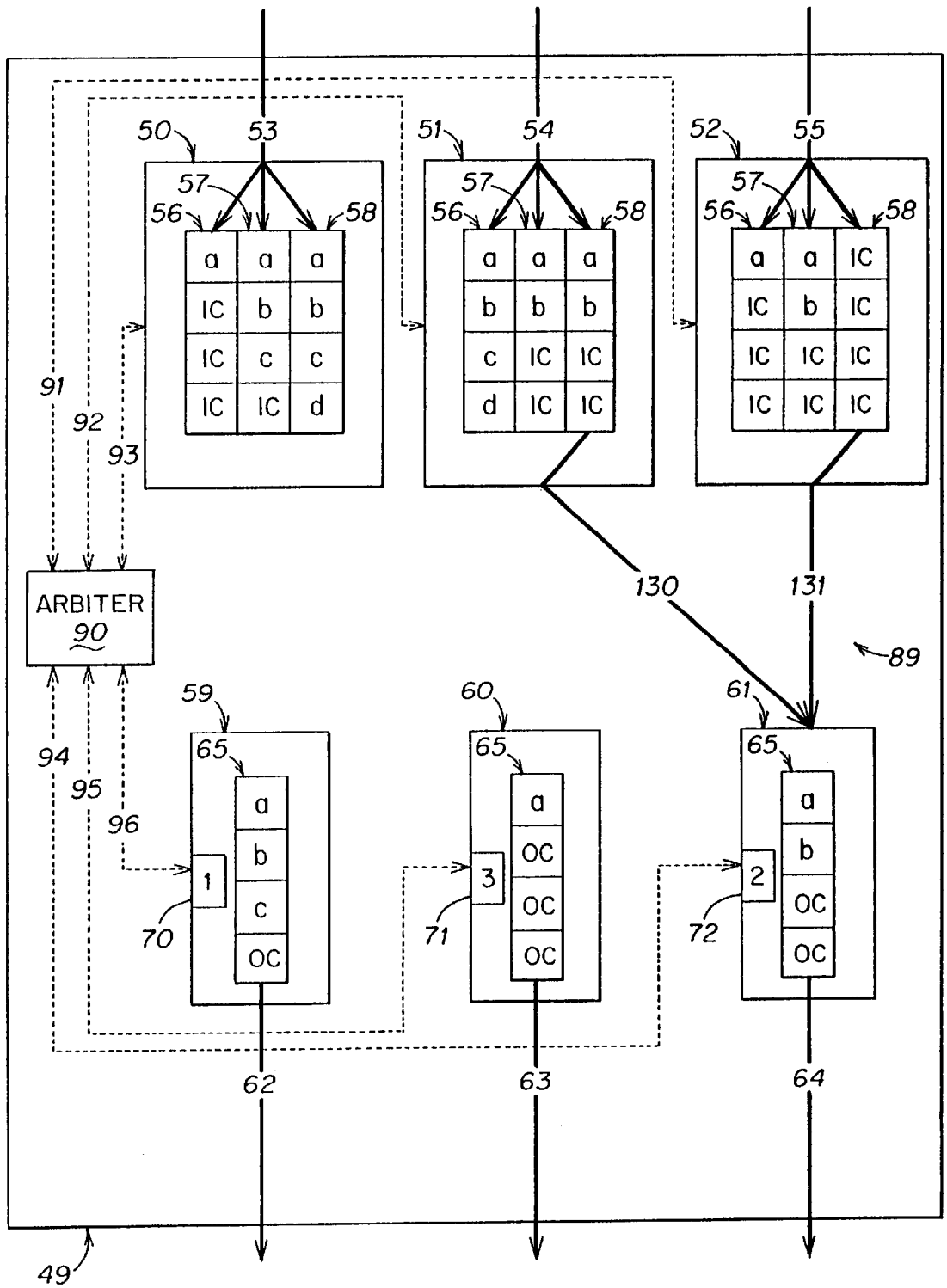
FIG. 9 illustrates an example of non-greedy output selection requests made in the second iteration of the non-greedy version of the LOOFA algorithm.
Figure 10:
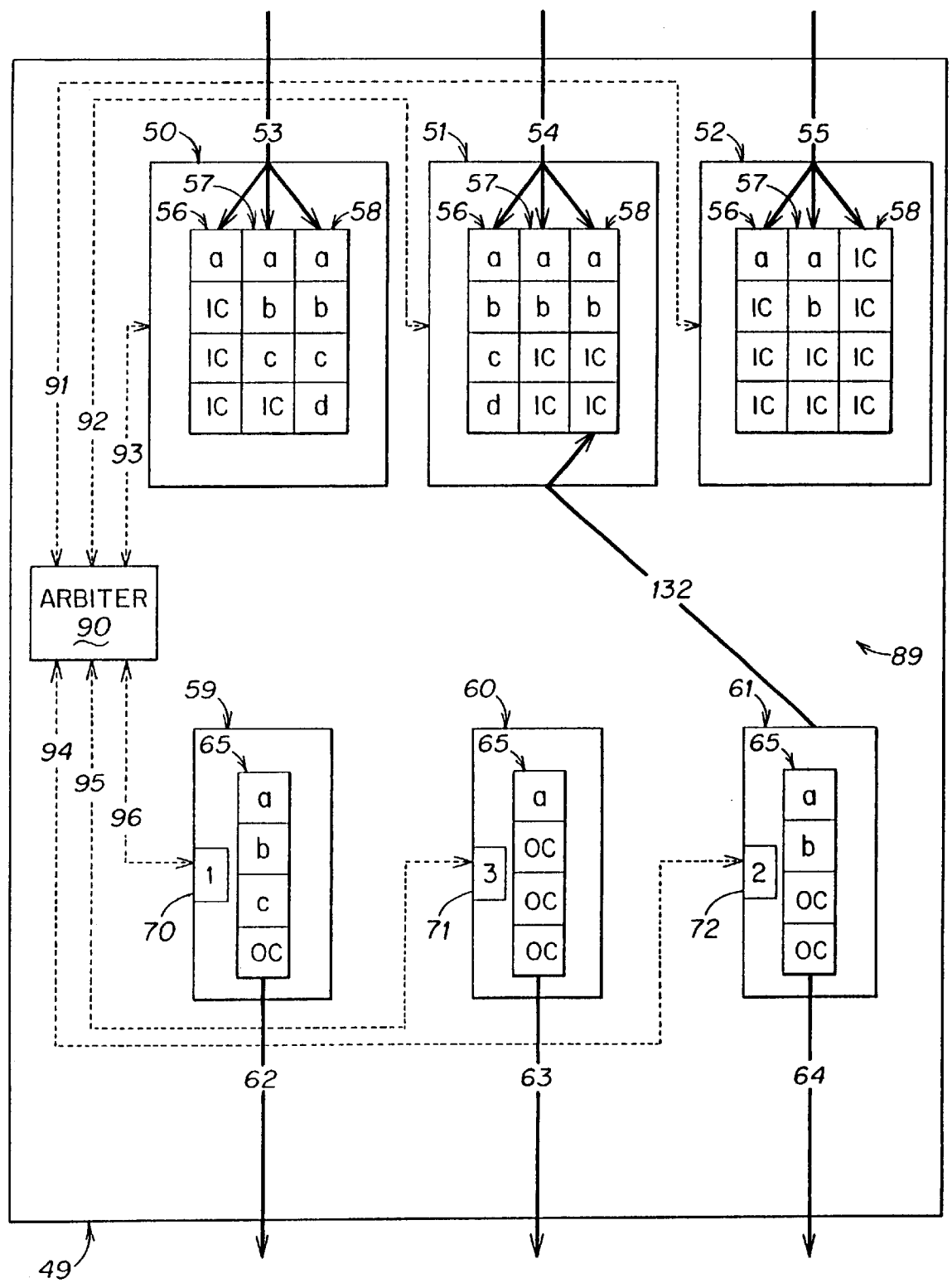
FIG. 10 illustrates non-greedy input selection grants made in the second iteration of the non-greedy version of the LOOFA algorithm, in response to the requests made in FIG. 9.

Accordingly, during the second iteration of non-greedy output selection requests (step 2) as illustrated in FIG. 9, since both input pots 51 and 52 each have IC cells active in virtual output queue 58 destined for the lowest rated occupancy output port 61, which has an occupancy rating 72 of two (versus the occupancy rating 71 of three for output port 60), each unmatched input port 51 and 52 has a request (requests 130 and 131) generated for output port 61, as illustrated in the figure. Next, as shown in FIG. 10, the second iteration of non-greedy input selection grants takes place and output port 61 has one of input ports 51 or 52 selected by the arbiter 90 according to an input selection algorithm. In the example in FIG. 10, the arbiter 90 selects input port 51, and generates a grant 132 for input port 51. The arbiter thus matches input port 51 with output port 61. Again, the arbiter typically makes these calculations for requests and grants internally according to an input selection algorithm.

In FIG. 11, only input port 52 and output port 60 remain unmatched for the third and final iteration of non-greedy LOOFA. Accordingly, FIG. 11 shows the request 133 generated for output port 60 from input port 52, since input port 52 had an IC cell queued-up in virtual output queue 57 that was destined for output port 60, and output port 60, being the last and only unmatched output port, had the lowest occupancy rating. FIG. 12 then shows that output port 60 generates a grant 134 for input port 52, since output port 60 only received the single request (133 in FIG. 11) from input port 52. After the grant 134 in FIG. 12 is generated by the arbiter 90, the arbiter has matched each input port to an output port according to the non-greedy version of LOOFA.

As such, it should be understood that non-greedy LOOFA requires at least N iterations in order to pair each input port with an output port, where N is the number of input ports. This is because in non-greedy LOOFA, only one match is made per iteration since only the single output port with the lowest occupancy rating receives requests and accordingly may only return one grant per iteration. Conversely, greedy LOOFA allows the arbiter to pair up potentially more than one set of input and output ports, as shown in the previous example. Thus, in greedy LOOFA, less than N iterations of output and input selection typically occur before no more matches can be made. It has been empirically observed that using the greedy version of the algorithm operating with a speedup of 2, there are no new connections that get made beyond the third iteration.

Once no more input ports can be matched to output ports, the iterations of the phase are complete. Cell transfers take place between the matched input and output ports (Step 5 of LOOFA) during the next phase, in which arbitration for the subsequent share begins. Cell transfer refers to the arbiter 90 signaling to the matched input ports to send one cell across the appropriate channel 80 through 88 in switch fabric 89 to the corresponding matched output port.

FIG. 13 shows the cell transfers that take place according to both examples of the greedy and non-greedy versions of the LOOFA algorithm. In FIG. 13, during the step 5 cell transfer operation of LOOFA, input port 50 will transfer one cell from virtual output queue 56 to the output port queue 65 of output port 59, input port 51 will transfer one cell from virtual output queue 57 to the output port queue 65 of output port 61, and finally, input port 52 will transfer one cell from virtual output queue 58 to the output port queue 65 of output port 60. After the cells have been transferred as shown in FIG. 13, the current phase of the current time slot in LOOFA is completed.

It is noted that the cell transfers for the greedy and non-greedy versions of LOOFA will typically be different especially when more ports contend to transfer over the fabric.

As noted above with respect to both greedy and non-greedy versions of LOOFA, during the input selection process, if more than one request is generated by the arbiter for a single output port, the arbiter must chose between two or more input ports from which to generate a grant and therefore receive a packet at the end of the current phase. This decision is made based upon the choice of input selection algorithm noted earlier. The arbiter uses the input selection algorithm to chose which input port gets a grant from an output port when more than one input port requests to send a cell to that output port.

The input selection algorithm may be performed in a variety of ways, each of which is within the scope of this invention.

When an output port has multiple requests from various input ports, but the arbiter may only generate a single grant for one of the input ports, the choice of implementation of the input selection algorithm (i.e., used in step 3 of LOOFA) will affect the fairness and delay properties of packets passing through the network device.

Fairness may be partially affected based on the input selection algorithm used, as well as other factors which will be discussed later. Generally, fairness refers to the even-handedness to which grants are generated for each entity contending for the network device's resources. The resource of a network device (e.g., router, switch) is the output port. An example of an entity is an input port. Fairness affects how fair the network device is to certain input ports in relation to other input ports that are waiting to transmit cells to the same output port. Fairness may be important in quality of service situations where a certain input data link for an input port is guaranteed a certain data rate. If the arbiter favors generating grants for this input port, the fairness of the switch may be altered to increase data rates for cells from that input port and therefore may move more data packets from the corresponding input data link.

Figure 14:
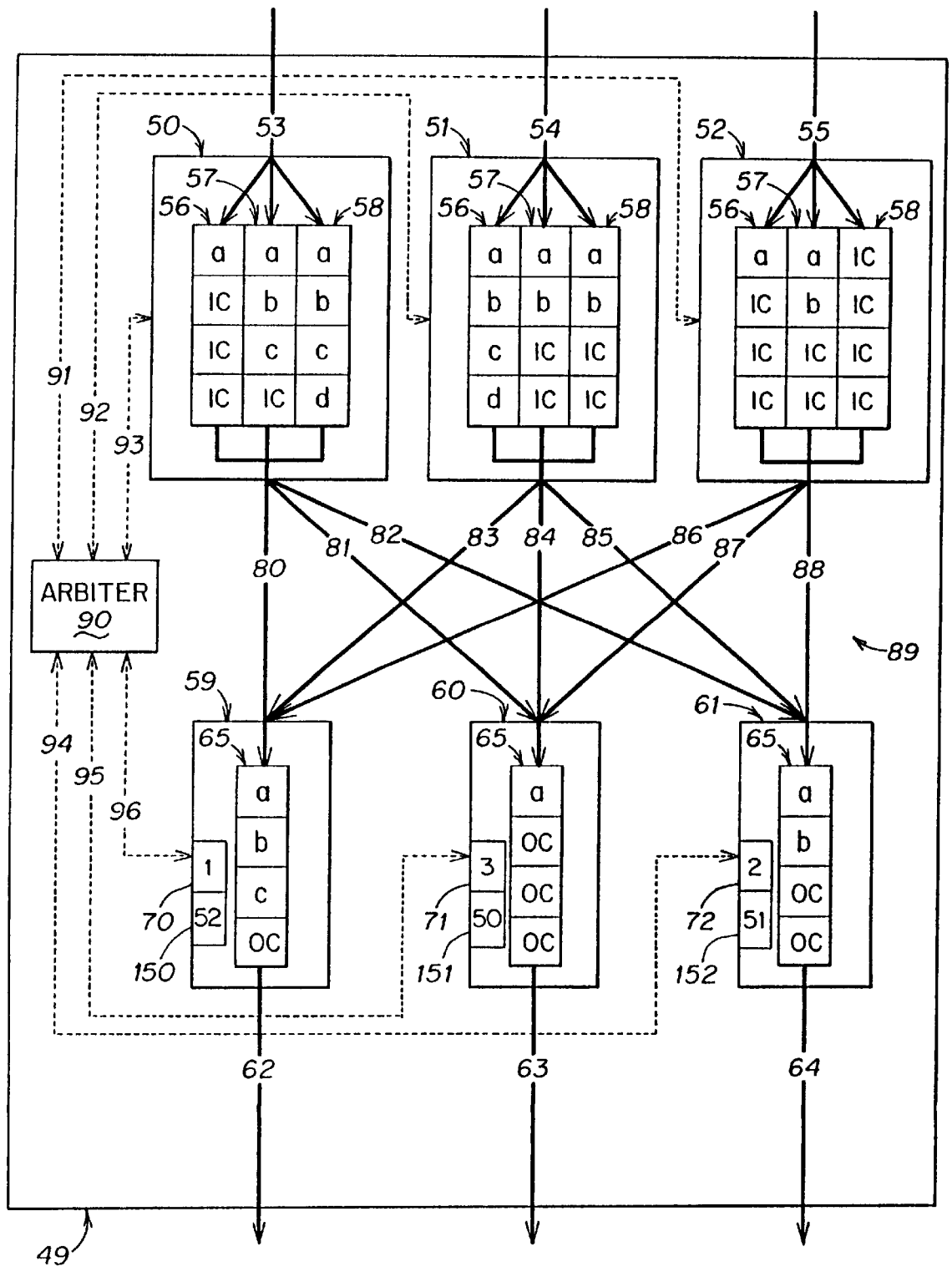
FIG. 14 illustrates an example of a round-robin input port indicator within each output port for use in making input selections according to the round-robin input selection algorithm.

One input selection algorithm that may be used to decide which one among many requesting input ports gets a grant from an output port is referred to as a circular or Round-Robin input selection algorithm. In the round-robin input selection algorithm, the arbiter, for example, keeps a round-robin pointer to input port numbers for each output port. FIG. 14 conceptually illustrates an example of a network device 49 including output ports 59, 60 and 61, each equipped with a round-robin pointer 150, 151, and 152, respectively. Each round-robin pointer 150, 151 and 152 contains an indication of the current input port to which a grant should be sent, in the event of receiving multiple requests. That is, in step 3 of LOOFA, when the arbiter 90 must decide, for an output port, which of multiple requesting input ports 50, 51 or 52 gets a grant, the round-robin pointer is consulted for the requesting input port which is next in turn. In the invention, the round-robin pointer is maintained as a counter within the arbiter or elsewhere.

The round-robin pointer is shown within each output port in the figure for ease of description and association with the invention only, and is not meant to limit the invention as such. Moreover, occupancy characteristics and virtual output queue information and other input and output port statistical information may all be maintained with the arbiter. The figures are conceptual in nature and do not limit the invention to embodiments illustrated therein.

For an example of round-robin input selection, suppose output port 60 received requests from input ports 50, 51 and 52. Using the round-robin algorithm for the input selection process in step 3 of LOOFA, input port 50 would be selected as the input port to receive the grant from output port 60, since the round-robin pointer 151 for this output port contains the input port number 50. After the grant is sent, the round-robin pointer 151 would be incremented by one to input port 51. If a round-robin pointer identifies an input port which did not send a request, but the output port received multiple requests during step 2 of LOOFA, then the round-robin pointer for that output port would be incremented until its value was equal to one of the requesting input ports. In this manner, requesting input ports may be fairly selected.

Another input selection algorithm that may be used in step 3 of LOOFA is referred to as a random input selection algorithm. As its name implies, this simple algorithm allows random selection of an input port to receive a grant when more than one input port requests to send a cell to an output port. In operation, the arbiter, when scheduling cell transfers, randomly chooses which single input port, from the many requesting to send a cell, will get the grant. Various weighted random selection algorithms may be used as well, in place of a purely random selection process. The random algorithm and its variants are not illustrated in the drawings, due to their simplistic nature and random operation.

Figure 15:
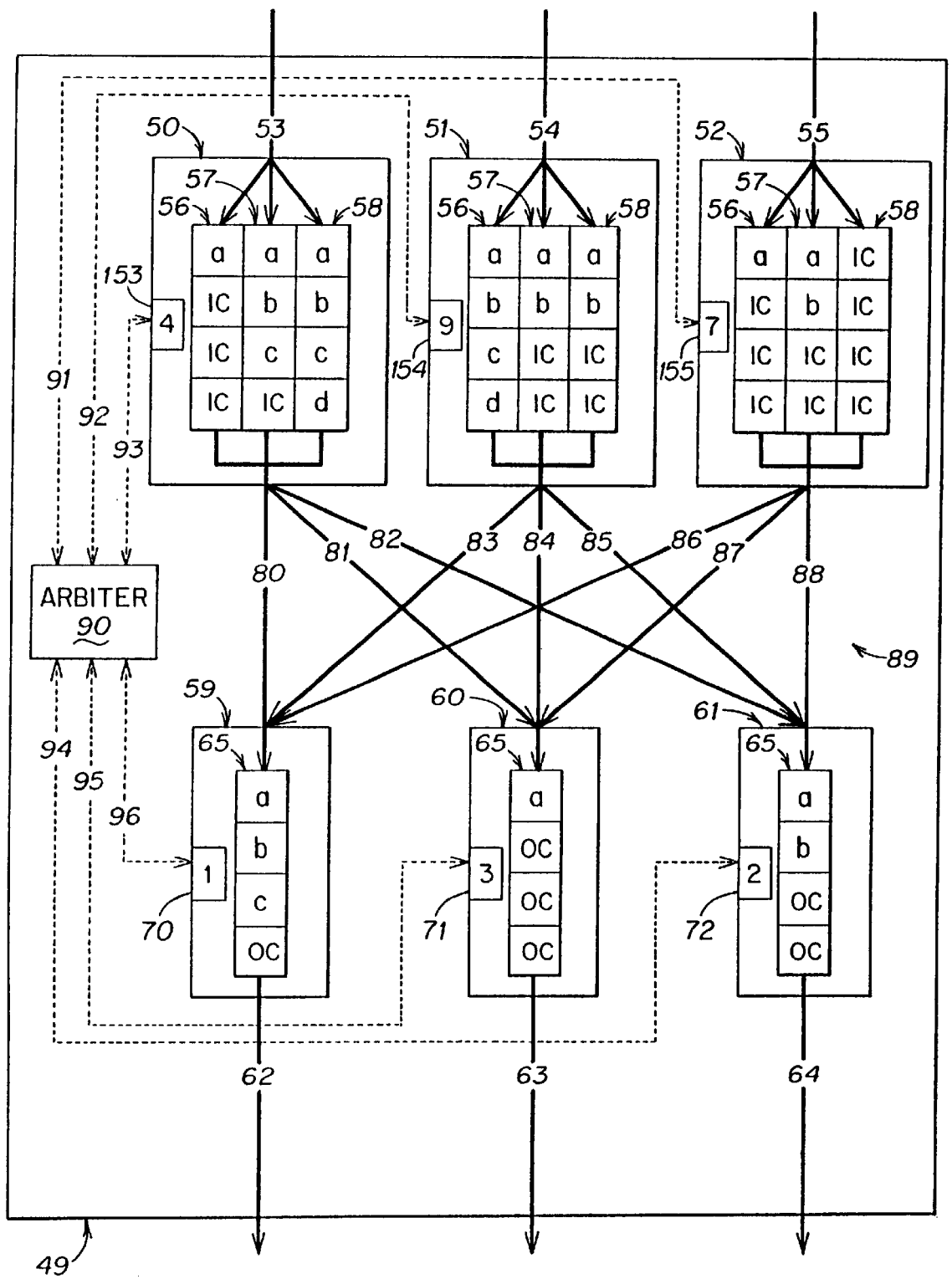
FIG. 15 illustrates an example of a Last Service Time indicator within each input port for use in making input selections according to the Last Service Time input selection algorithm.

Another input selection algorithm that may be used in step 3 of LOOFA is referred to as the Last Service Time algorithm. FIG. 15 illustrates a network device configured to use the Last Service Time algorithm. The last service time is maintained for each VOQ (i.e., each input, output pair). The time stamp indicates the last time this VOQ was able to send a cell. So the arbiter has to maintain $N^2$ time stamps: one each for each VOQ. After the cell gets transferred from a VOQ, the last service time for the VOQ gets updated to the current time.

As an example, suppose in FIG. 15 that output port 60 receives a request from all three input ports 50, 51, and 52 during step 2 of LOOFA. In step 3 of LOOFA, using the Last Service Time input selection algorithm, the arbiter 90 would consult the time stamps 153, 154 and 155 of each of these input ports for their time stamp values. A time stamp value indicates how much time has passed since that input port has transferred a cell across the switch fabric 89. The arbiter 90 would generate a grant for the input port having the highest time stamp, in this example input port 51, since input port 51 has been waiting the longest of the requesting input ports to transfer a cell, as indicated by its time stamp 154 having a value of 9. Using-Last Service Time, input ports that have not recently sent cells will be favored over input ports that have recently sent cells across the switch fabric.

Figure 16:
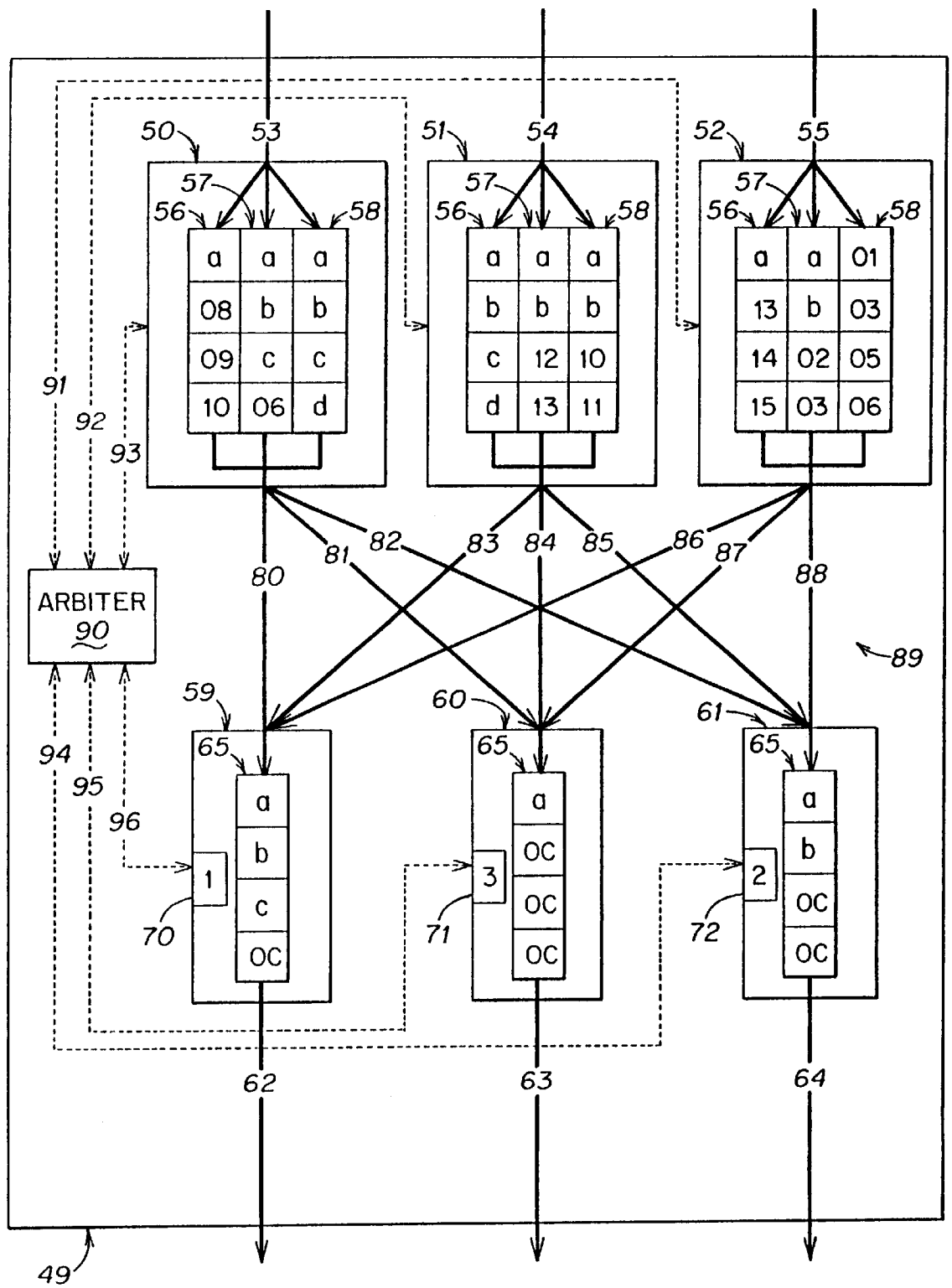
FIG. 16 illustrates an example of each queued input cell including a time stamp within the virtual output queues of each input port for use in making input selections according to the Oldest Cell First input selection algorithm.

FIG. 16 illustrates a network device configured for yet another input selection algorithm that may be used in step 3 of LOOFA, referred to as Oldest Cell First. Using this algorithm, the network device can keep track of the lifetime of each cell queued in virtual output queues of each input port. As shown in FIG. 16, each input buffer having a queued input cell indicates the time stamp of that cell as a numerical value in the cell input buffers. For example, in input port 52 in FIG. 16, the head cell of virtual output queue 56 (input buffer position "d" from FIG. 1) has a time stamp of 15, while the head cell of virtual output queue 57 has a time stamp or 03, and finally, the head cell of virtual output queue 58 has a time stamp of 01. The higher the time stamp number, the older the cell. In other words, the higher the time stamp, the longer the cell has been queued. In an implementation of the invention using Oldest Cell First as an input selection algorithm, upon cell arrival in a VOQ, the cell, or the pointer to the cell maintained in the arbiter, is tagged with the current time stamp, indicating the time of cell arrival.

In Oldest Cell First, when an output port receives more than one request from input ports, the arbiter 90 can then chose which input port gets the corresponding grant based on the individual cell time stamps of the cell to be transferred from each requesting input port. In this manner, each request sent in step 2 of LOOFA includes a cell time stamp indication corresponding to the age of the cell that will be transmitted should that requesting input port receive the grant (i.e., requesting input ports with a cell waiting).

For example, in FIG. 16, if output port 59 received a request from input ports 50 and 52 during step 2 of LOOFA, using Oldest Cell First, the cells would have time stamps of 10 and 15, respectively. Then, in step 3 during input selection, the arbiter 90 would generate the grant for input port 52, since the cell from virtual output queue 56 in input port 52 had the oldest time stamp value of 15, as compared to the time stamp of 10 for the other request received from input port 50.

Generally, in Oldest Cell First, of all requests received at the output port, the requesting input port that contains the cell that has been in the network device for the longest time will be granted permission to be transferred across the switch fabric, since the requests will indicate that the corresponding cell is the oldest. That is, the request will contains the time stamp of the cell as part of the request. The Oldest Cell First input selection algorithm improves the delay properties of the network device by ensuring that no cell is queued much longer than any other.

It is noted here that in this invention, if the input selection algorithm used in the network device is either oldest cell first, or last service time, when the request is sent from the input port to the output port, a time stamp is included within the request. In the case of oldest cell first, the time stamp indicates the time of cell arrival; in the case of last service time, the time stamp indicates the last time that VOQ sent a cell.

As noted previously, this invention is concerned with, among other things, two important metrics; work-conservation and fairness. If a network designer using this invention is only concerned about throughput and data link utilization, the data in the output ports of a network device operating using LOOFA can be arranged simply in a First In, First Out (FIFO) manner, as shown in each of output port 59, 60 and 61 in FIGS. 1 through 16. In these embodiments, whenever the output data link 62, 63 or 64 is available to receive data for transmission onto the network, the head of the output buffer 65, labeled as position 'd' in FIGS. 1 through 16, is selected from the FIFO queue and transferred onto the network data link. This simple dequeueing operation is performed for each data link for each output port, as fast as the data link can accept and send the data.

However, if the network designer using this invention, in addition to work-conservation, requires fairness for data transferred through the network device, the data in the output ports of the network device operating using LOOFA can be stored in random access buffers, and the pointers to the data are stored in the respective virtual input queues (VIQs). Output ports with VIQs have a bank of queues, one per input port. As will be explained, virtual input queues allow each of the previously mentioned input selection algorithms to increase fairness for the network device.

Figure 17:
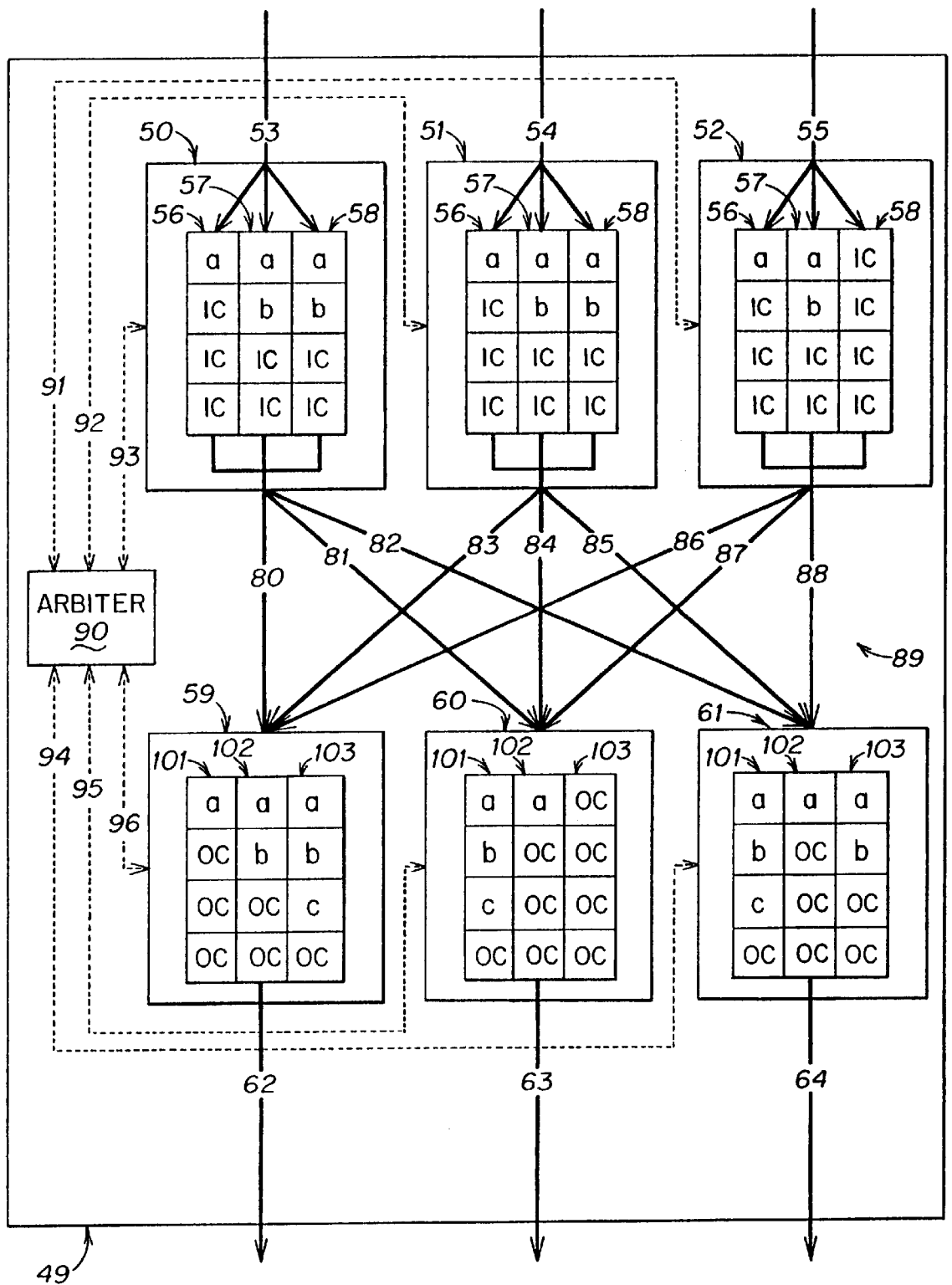
FIG. 17 illustrates an embodiment of the invention that uses virtual input queues within the output ports of the network device.

FIG. 17 illustrates an example network device architecture that uses virtual input queues 101, 102 and 103 within output ports 59, 60 and 61. A virtual input queue structure which buffers data in the output ports is very similar to the virtual output queues of the input ports. There is one virtual input queue 101, 102 and 103 in each output port 59, 60 and 61 that corresponds with each input port 50, 51 and 52. The arbiter 90 maintains a pointer (not shown) to the head of each virtual input queue in each output port, and is therefore aware of each virtual input queue's occupancy rating.

Whenever a cell is transferred across the switch fabric 89 of a network device 49 using virtual input queues in output ports, the input port (i.e. the source) from which that cell was transferred is determined and the cell is placed into that input ports corresponding virtual input queue upon arrival at that output port. The source input port may be determined from header information within the cell itself, for example. For example, in FIG. 17, since virtual input queue 102 corresponds to input port 51, all OC cells queued in virtual input queue 102 during operation will have been sent from input port 51.

Whenever an output data link 62, 63 or 64 is available to accept data for transmission from the network device 49 onto the network (not shown), the data link 62, 63 or 64 can select data from the next virtual input queue 101, 102 or 103 for each output port 59, 60 and 61, according to, for example, a round-robin selection algorithm. The data or cell pointed to by the head of the selected virtual input queue is then transmitted onto the output data link 62, 63 or 64.

Accordingly, in each of the aforementioned input selection algorithms, using virtual input queues in the output ports increases fairness for data transferred through the network device.

Aside from the previously discussed input selection algorithms used with LOOFA, another input selection algorithm may be used according to this invention that is generally only applicable to embodiments of the invention that use virtual input queues, such as the embodiment illustrated in FIG. 17. This input selection algorithm is referred to as "Shortest Queue First".

In the Shortest Queue First input selection algorithm according to this invention, when an output port, such as output port 60 in FIG. 17, receives requests from more than one input port, such as from each of input ports 50, 51 and 52 in FIG. 17, the output port 60 examines each of its virtual input queues 101, 102 and 103 to determine which has the shortest corresponding virtual input queue. The input port having the shortest corresponding virtual input queue will be the input port which receives the grant to transmit a cell to the output port.

In the example being discussed with respect to FIG. 17, VIQ 101 corresponding to requesting input port 50 has a VIQ queue length or occupancy characteristic (indicated by the OC cells in each VIQ in FIG. 17) of one, VIQ 102 corresponding to input port 51 has a queue length of three, and VIQ 103 corresponding to input port 52 has a queue length of four OC cells. Accordingly, since VIQ 101 is the shortest, input port 50 corresponding to this VIQ gets the grant.

Table 1 summarizes the features of the different input selection algorithms that may be used by the arbiter of the invention when determining which input ports receives a grant from an output port that has multiple requests from those input ports. Note that if two input ports requesting have a tie, for example, have equal length virtual input queues, then the tie is broken arbitrarily.

TABLE 1

| INPUT SELECTION ALGORITHM/OUTPUT PORT ACTION | |
|---|---|
| INPUT SELECTION ALGORITHM | OUTPUT PORT PROCESSING FOR SELECTING WHICH INPUT PORT OF MANY REQUESTING INPUT PORTS GETS GRANT |
| Round-Robin | Output port 'picks' the first 'requesting' input port which is pointed to by round-robin pointer, or |

TABLE 1-continued

INPUT SELECTION ALGORITHM/OUTPUT PORT ACTION

| INPUT SELECTION ALGORITHM | OUTPUT PORT PROCESSING FOR SELECTING WHICH INPUT PORT OF MANY REQUESTING INPUT PORTS GETS GRANT |
|---|---|
| Oldest Cell First, and Last Service Time | next input port number after round-robin pointer Output port 'picks' the 'requesting' input port with the oldest time stamp sent along with the request |
| Random | Output port randomly 'picks' an input port from one of the requesting input ports. |
| Shortest Queue First | Output port 'picks' the requesting input port whose Virtual Input Queue (VIQ) in this output port has the shortest queue length. |

In the previous discussion of the invention, the LOOFA arbitration algorithm can operate at all times on all input and output ports having data to be transferred across the switch fabric. That is, during arbitration, all input and output ports can take part in arbitration, so long as data or cells are present to be sent. However, under certain heavy load conditions, when large amounts of data are present in the network, flow control may be required and used within the network device of this invention to control the amount of data input by any one input port through the switch fabric to an output port.

Generally, each output port is responsible for turning on or off flow control to one or more input ports that are providing too many packets to that output port. As such, to implement flow control within a network device according to the invention, generally, the arbiter, as previously discussed, tracks the occupancy rating of either the single FIFO output buffers (e.g. 65 in FIGS. 1 through 16) or the virtual input queues (e.g. 102, 102 and 103 in FIG. 17) in each output port. When either a FIFO occupancy rating, or a VIQ occupancy rating becomes too high, the output port turns on flow control for either all input ports to that output port or for just the one input port sending to an overloaded VIQ.

For FIFO embodiments, a flow control message from an output port instructs all input ports to not send any more cells or requests to that output port. For VIQ embodiments, if any one virtual input queue in any one output port exceeds the threshold occupancy rating, flow control is turned on for the input port corresponding to that virtual input queue in that particular output port. As such, that input port stops sending cells and requests to that output port.

Thus, in this invention, flow control can be used to effectively deactivate entire output ports or an individual output port's virtual input queue for a number of successive iterations of the LOOFA algorithm, in order for the data queued in the overloaded FIFO or VIQ to be unloaded onto the network. Flow control for an input port may be turned off when the number of cells in either the overloaded FIFO or the VIQ drops below the threshold level, as determined by the arbiter.

Generally, in the above described embodiments of the invention, requests generated by the arbiter for input ports and grants generated by the arbiter for output ports are contained and maintained within the arbiter itself. That is, the bulk of the input-output port connection decision making processing of FIGS. 3 through 13 is performed internally within the arbiter processing device 90. The figures show the occupancy rating and, for example, round-robin pointer values, but those numbers are maintained within data structures or as registers within the arbiter 90. For example, bit vectors may be used within the arbiter as a means for tracking requests and grants within the arbiter.

More specifically, during the output selection processing of step 2 in LOOFA, each input port sends a virtual output queue bit vector that indicates which virtual output queues in that input port have a cell queued to send to an output port, where each bit position in the bit vector represents a virtual output queue and output port paired association. The arbiter then uses each virtual output queue bit vector from input ports to set a single request bit in a request bit vector in the bit position of the lowest occupancy output port. Each bit set in the request bit vector for an output port identifies an input port requesting to send a packet to that output port. Then, the arbiter, using the round-robin pointer for example, selects one of those request bit positions in the request bit vector for each output port to represent the input port that will get the grant. The arbiter then sets up a grant bit vector for each input port, with a bit set in the single virtual output queue position for that input port corresponding to the output port giving the grant. If no bits are set in the grant bit vector corresponding to an input port, then no grant was given to that input port. The bit vectors may be quickly sent between the arbiter and the input and output ports to communicate the necessary information about requests, grants and then cell transfers. In this manner, the arbiter quickly determines and processes requests and grants.

In yet another embodiment, the requests and grants do not actually exist as real messages at all. That is, the arbiter is a microprocessor running the LOOFA algorithm in software which performs most of the processing functionality of steps 1 through 5 of LOOFA internally using data structures and variables. In such an embodiment, the arbiter completes the processing of a phase of LOOFA, and determines which input ports should send cells to which output ports (i.e., the matched input-output pairs), the arbiter signals to the appropriate input ports to transmit certain cells at the appropriate time. The microprocessor obtains input data to track cell arrivals in virtual output queues and cells that are dequeued from output port queues, in order to keep the calculations accurate.

The occupancy ratings of each output port's output port queue are kept internally within the arbiter in software or hardware. The virtual output queue activity is signaled internally to the arbiter via the input control lines (i.e., lines 91, 92 and 93 in FIGS. 2 and 3). Keeping as much processing functionality of the invention within the arbiter increases the processing operation of the output and input selection portions of LOOFA, thus allowing faster switching of cells and therefore packets through the network device.

Using a speedup of two for the switch fabric, in conjunction with the novel LOOFA arbitration algorithm, provides a network device that is work conserving for all loads and that is equivalent in performance to a benchmark output buffered switch requiring much greater speedup of the switch fabric. Generally, a speedup of two may be realized by operating the switch fabric via the arbiter at twice the speed of the input ports, as explained previously. That is, the arbiter performs the same connection set-up tasks as required for a speedup of one, but in one-half the time. This results in accomplishing twice as many packet transfers across the switching fabric in a single time slot. As a general rule, for a speedup of S for a switch fabric, the arbiter schedules and transfers at most S cells or packets from an input port (i.e., from one of the virtual queues of an input port) to an output port, where S is the speedup.

Figure 18:
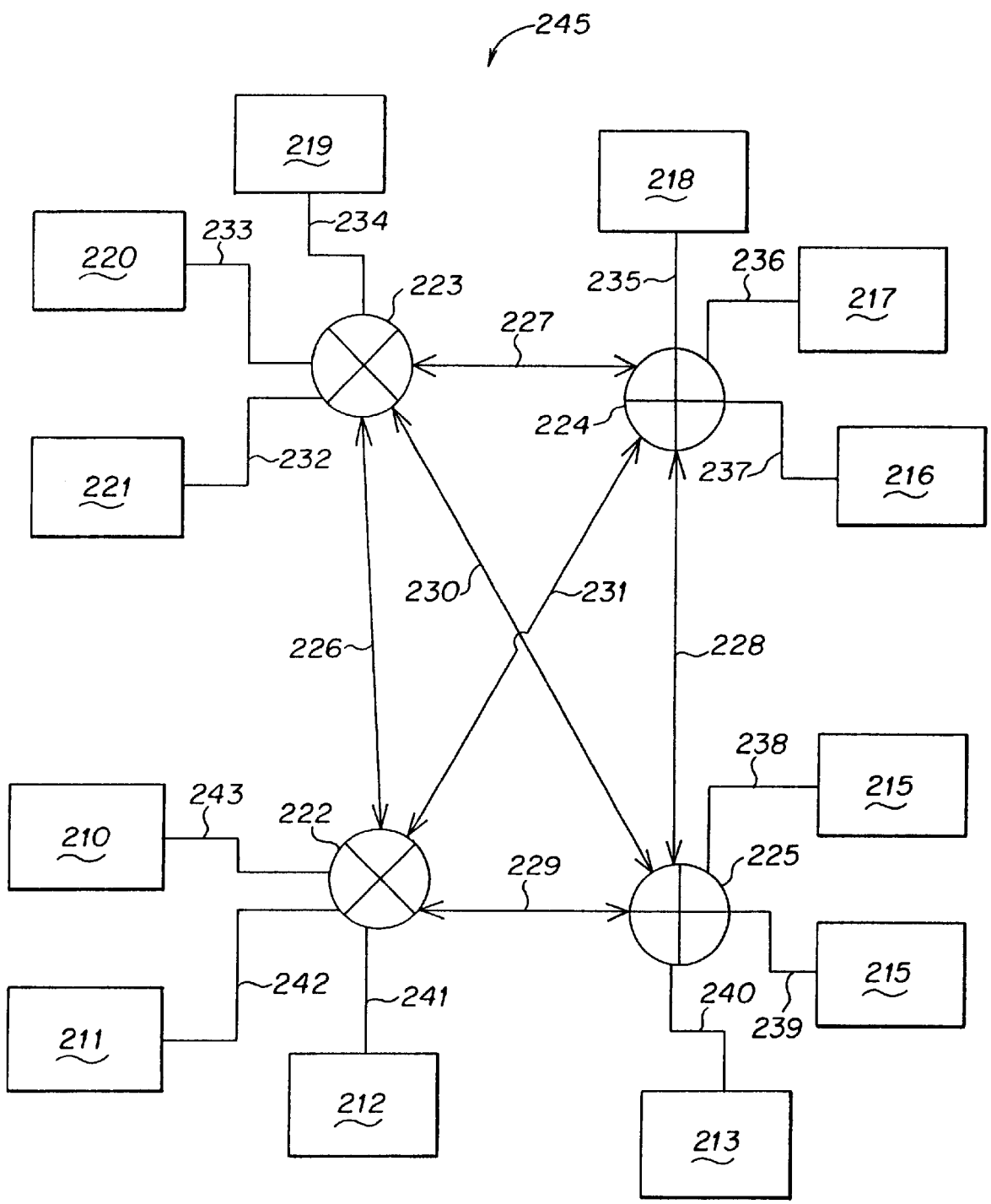
FIG. 18 illustrates an example of a computer networking environment in which the present invention may operate.

FIG. 18 illustrates an example of a computer network 245 in which the present invention may advantageously operate. Host computers 210 through 221 connect via data links 232 through 243 to network devices 222 through 225. Network devices 222 through 225 interconnect with each other over data links 226 through 231 in order to forward data between the hosts 210 through 221. For example, to transmit data from host 210 to host 213, the data is typically sent from host 210 in packets onto data link 243, which connects to an input port on network device 222. Network device 222 receives the data, transfers the data across an internal switching fabric (not shown in FIG. 18), and forwards the data from an output port onto data link 229. Network device 225 then receives the data on an input port coupled to data link 229, transfers the data through its internal switching fabric, and forwards the data out of an output port onto data link 240 towards destination host 213. Each network device 222 through 225 in FIG. 18 has input ports that receive data, output ports that send data, and a switching fabric that allows data to be transferred between the input and output ports, all as previously described in this invention.

In computer networking applications of this invention, such as the example computer network 245 in FIG. 18, the technology of the invention may be applied to the network devices 222 through 225, which may for example be hubs, switches, routers, bridges and other forms of networked data transmission equipment that move data between multiple data links, sources, destinations, devices or networks. For example, one or more of network devices 222 through 225 may be a switch that transfers data packets between different network data links or segments. The network switch may use the technology disclosed herein as the invention to its benefit. This is because a switch, for example, often must buffer packets on either side (i.e. input and output sides of connections within the switch) of the switch as the switch fabric transfers packets between each different network segment linked by the switch. Accordingly, switches buffering packets at input and outputs may be modeled as combined input-output buffered network devices and may apply the invention as disclosed.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A data processing apparatus for transferring data packets between input ports and output ports, the input ports for receiving the data packets into the apparatus and the output ports for transmitting the data packets from the apparatus, the apparatus comprising:
    a switch fabric connecting input buffers in the input ports to output buffers in the output ports to allow the data packets to be transferred between the input ports and the output ports; and
    an arbiter that controls the switch fabric to prioritize an order in which the data packets are transferred from the input buffers to the output buffers according to occupancy characteristics of the output buffers;
    wherein the switch fabric has a speedup of two, wherein the input buffers in the input ports are arranged into virtual output queues, each virtual output queue corresponding to a distinct output port; and
    the arbiter includes:
        output buffer occupancy rating detectors indicating the occupancy characteristics of the output buffers for the output ports;
        an output selector that selects a virtual output queue of an unmatched input port corresponding to an unmatched output port having a lowest occupancy characteristic, and that generates a request for that unmatched output port identifying that input port;
        an input selector that selects an unmatched input port to be matched with an unmatched output port based upon requests received from the output selector, and that generates a grant for the output selector giving permission for a selected unmatched input port to transfer a packet from its virtual output queue corresponding to the output port sending the grant, to that unmatched output port, thus matching the unmatched input port and unmatched output port.

2. The data processing apparatus of claim 1, wherein the output selector selects the virtual output queue of the unmatched input port only if the virtual output queue corresponds to a single unmatched output port having a lowest occupancy characteristic of a set of all unmatched output ports.

3. The data processing apparatus of claim 2, wherein the input selector selects the unmatched input port according to an input port selection algorithm that maximizes fairness properties of the apparatus in transferring data packets and/or minimizes delay properties of the apparatus in transferring data packets by having output buffers in the output ports arranged into virtual input queues, one virtual input queue for each input port, and wherein each virtual output queue buffers cells sent from its corresponding input port.

4. The data processing apparatus of claim 2, wherein the input selector selects the unmatched input port according to a round-robin input port selection algorithm.

5. The data processing apparatus of claim 4, wherein the input selector maintains an indication of a previously selected input port and selects the unmatched input port according to a next input port indicated within the input port requests received in relation to the previously selected input port.

6. The data processing apparatus of claim 2, wherein the input selector selects the unmatched input port according to a Last Service Time input port selection algorithm.

7. The data processing apparatus of claim 6, wherein:
    the input ports maintain, for each virtual output queue, a time-stamp of a last time each virtual output queue transferred a data packet from its associated input port to an output port, and time-stamp information for virtual output queues is communicated to the input selector; and
    wherein the input selector selects the unmatched input port from the input port requests received according to an oldest time-stamp.

8. The data processing apparatus of claim 2, wherein the input selector selects the unmatched input port according to an Oldest Cell First input port selection algorithm.

9. The data processing apparatus of claim 6, wherein:
    the input ports maintain a cell time stamp for cells of packets, and cell time stamp information for virtual output queues is communicated to the input selector; and wherein the input selector selects the unmatched input port from the input port requests received according to an oldest cell time-stamp.

10. A data processing apparatus for transferring data packets between input ports and output ports, the input ports for receiving the data packets into the apparatus and the output ports for transmitting the data packets from the apparatus, the apparatus comprising:
   a switch fabric connecting input buffers in the input ports to output buffers in the output ports to allow the data packets to be transferred between the input ports and the output ports; and
   an arbiter that controls the switch fabric to prioritize an order in which the data packets are transferred from the input buffers to the output buffers according to occupancy characteristics of the output buffers;
   wherein the switch fabric has a speedup of two and wherein the input selector selects the unmatched input port according to a shortest queue first input selection algorithm that uses virtual input queue occupancy ratings to determine input port selection.

11. The data processing apparatus of claim 1, wherein the output selector selects the virtual output queue of the unmatched input port, wherein the virtual output queue selected corresponds to any unmatched output port having a lowest occupancy characteristic within a set of all unmatched output ports corresponding to active virtual output queues within that unmatched input port.

12. The data processing apparatus of claim 11, wherein the input selector selects the unmatched input port according to an input port selection algorithm that maximizes fairness properties of the apparatus in transferring data packets and/or minimizes delay properties of the apparatus in transferring data packets by having output buffers in the output ports arranged into virtual input queues, one virtual input queue for each input port, and wherein each virtual input queue maintains pointers to cells sent from its corresponding input port.

13. The data processing apparatus of claim 11, wherein the input selector selects the unmatched input port according to a round-robin input port selection algorithm.

14. The data processing apparatus of claim 13, wherein the input selector maintains an indication of a previously selected input port and selects the unmatched input port according to a next input port indicated within the input port requests received in relation to the previously selected input port.

15. The data processing apparatus of claim 11, wherein the input selector selects the unmatched input port according to a Last Service Time input port selection algorithm.

16. The data processing apparatus of claim 15, wherein:
   the input ports maintain, for each virtual output queue, a time-stamp of a last time each virtual output queue transferred a data packet from its associated input port to an output port, and time-stamp information for virtual output queues is communicated to the input selector; and
   wherein the input selector selects the unmatched input port from the input port requests received according to an oldest time-stamp.

17. The data processing apparatus of claim 11, wherein the input selector selects the unmatched input port according to an Oldest Cell First input port selection algorithm.

18. The data processing apparatus of claim 17, wherein:
   the input ports maintain a cell time stamp for cells of packets, and cell time stamp information for virtual output queues is communicated to the input selector; and
   wherein the input selector selects the unmatched input port from the input port requests received according to an oldest cell time-stamp.

19. A data switching apparatus, comprising:
   input ports for receiving into the apparatus data packets;
   output ports for transmitting the data packets from the apparatus;
   a switch fabric connecting the input ports to the output ports to allow the data packets to be transferred between the input ports and the output ports, wherein the switch fabric has bandwidth that is at least twice that of the input and output ports;
   an arbiter that controls the switch fabric to prioritize an order in which the data packets are transferred from the input ports to the output ports according to an occupancy characteristic of the output ports;
   wherein the arbiter, for unmatched input ports, includes a means for requesting an unmatched output port to be matched with an input port based on which unmatched output port corresponding to an active virtual output queue of that input port has a lowest occupancy rating of its buffered data packets of all output ports corresponding to active virtual output queues for that input port;
   and wherein the arbiter, for unmatched output ports, includes a means for selecting an input port that will transfer a packet to an output port based on an input port selection algorithm, and for matching the selected unmatched input port with that unmatched output port.

20. A data switching apparatus, comprising:
   input ports for receiving into the apparatus data packets;
   output ports for transmitting the data packets from the apparatus;
   a switch fabric connecting the input ports to the output ports to allow the data packets to be transferred between the input ports and the output ports, wherein the switch fabric has bandwidth that is at least twice that of the input and output ports;
   an arbiter that controls the switch fabric to prioritize an order in which the data packets are transferred from the input ports to the output ports according to an occupancy characteristic of the output ports;
   wherein the arbiter, for unmatched input ports, includes a means for requesting an unmatched output port to be matched with an input port, only if an unmatched output port corresponding to an active virtual output queue of that input port has a lowest occupancy rating of its buffered data packets of all unmatched output ports in the data switching apparatus;
   and wherein the arbiter, for unmatched output ports, includes a means for selecting an unmatched input port that will transfer a packet to an output port based on an input port selection algorithm, and for matching the selected unmatched input port with that unmatched output port.

21. A method for switching data packets between input ports and output ports of a network device, the method comprising the steps of:
   receiving the data packets into the network device on input ports;
   controlling a switch fabric to prioritize an order in which the data packets are transferred from the input ports to output ports according to an occupancy characteristic of the output ports;
   transmitting the data packets from the network device on output ports;

wherein the input ports contain input buffers arranged into virtual output queues, each virtual output queue corresponding to a distinct output port, the method further comprising the steps of:

detecting the occupancy characteristic of the output ports of the network device;

selecting, for a specific unmatched input port, a virtual output queue corresponding to an unmatched output port having a lowest occupancy characteristic;

generating, for the unmatched output port having the lowest occupancy characteristic, a request identifying the specific unmatched input port;

selecting, for the unmatched output port having the lowest occupancy characteristic, an unmatched input port to be matched with that unmatched output port based upon an input port selection algorithm;

sending a grant to the unmatched input port giving permission for the unmatched input port to transfer a packet from its virtual output queue corresponding to the unmatched output port having the lowest occupancy characteristic to the unmatched output port having the lowest occupancy characteristic, thus matching the unmatched input port to the unmatched output port.

22. The method of claim 21, wherein the controlling a switch fabric step controls the switch fabric such that the switch fabric has a speedup of two.

23. The method of claim 21, wherein the step of selecting a virtual output queue for a specific unmatched input port selects a virtual output queue only if the virtual output queue corresponds to a single unmatched output port having a lowest occupancy characteristic of a set of all unmatched output ports in the network device.

24. The method of claim 23, wherein the input port selection algorithm used is a round-robin input port selection algorithm.

25. The method of claim 24, further comprising the steps of:

maintaining an indication of a previously selected input port; and selecting an unmatched input port according to a next input port indicated within the input port requests received in relation to a previously selected input port.

26. The method of claim 23, wherein the input port selection algorithm used is a last service input port selection algorithm.

27. The method of claim 26, further comprising the steps of:

maintaining, for each virtual output queue, a time-stamp of a last time that virtual output queue transferred a data packet from its associated input port to an output port; and selecting an unmatched input port according to an oldest time-stamp of all input ports corresponding to input port requests received.

28. The method of claim 23, wherein the input port selection algorithm used is an Oldest Cell First input port selection algorithm.

29. The method of claim 28, further comprising the steps of:

maintaining a time stamp for each cell of a packet; and selecting an unmatched input port according to a request received, where said request is associated with a cell having an oldest time stamp.

30. The method of claim 23, wherein the input port selection algorithm used is a Shortest Queue First input port selection algorithm that bases input port selection based upon the occupancy rating of virtual input queues associated with input ports requesting to send data to an output port.

31. The method of claim 21, wherein the step of selecting a virtual output queue for a specific unmatched input port selects the virtual output queue corresponding to any unmatched output port having a lowest occupancy characteristic within a set of all unmatched output ports corresponding to active virtual output queues within that unmatched input port.

32. The method of claim 31, wherein the input port selection algorithm used is a round-robin input port selection algorithm.

33. The method of claim 32, further comprising the steps of:

maintaining an indication of a previously selected input port; and selecting an unmatched input port according to a next input port indicated within the input port requests received in relation to a previously selected input port.

34. The method of claim 31, wherein the input port selection algorithm used is a last service input port selection algorithm.

35. The method of claim 34, further comprising the steps of:

maintaining, for each virtual output queue, a time-stamp of a last time that virtual output queue transferred a data packet from its associated input port to an output port; and selecting an unmatched input port according to an oldest time-stamp of all input ports corresponding to input port requests received.

36. The method of claim 31, wherein the input port selection algorithm used an Oldest Cell First input port selection algorithm.

37. The method of claim 36, further comprising the steps of:

maintaining a time stamp for each cell of a packet; and selecting an unmatched input port according to a request received, where said request is associated with a cell having an oldest time stamp.

38. The method of claim 21, further including the step of maintaining, for each output port, a flow control status which is turned on when the number of queued cells in a portion of the output buffer for that output port exceeds a threshold, such that one or more input ports do not to send cells to that output port.

39. An arbiter for a network device that operates the network device in a work conserving manner, comprising:

an output selector that selects a virtual output queue of an input port of the network device that has data for an output port of the network device, wherein the selection of the virtual output queue is based upon which virtual output queue corresponds to an output port having a lowest occupancy rating, and wherein the output selector includes a means for sending a request to the selected output port;

an input selector that selects an input port that is to send data to the selected output port, wherein the selection of the input port is based upon an input port selection algorithm that chooses between one or more input ports represented by requests sent from the output selector;

a means for signaling to the input and output ports of the network device to transmit cells across a switch fabric of the network device; and wherein the output selector and the input selector and the means for signaling operate at a processing rate that allows the switch fabric to maintain a speedup of twice that of an incoming data rate for the input ports of the network device.

40. The arbiter of claim 39, wherein the selection of the virtual output queue is made only if an output port having a lowest occupancy rating of all output ports in the network device corresponds to an active virtual output queue within the input port.

41. The arbiter of claim 39, wherein the selection of the virtual output queue is made based on an output port having a lowest occupancy rating, as selected from a set of output ports corresponding only to active virtual output queues within the input port.

* * * * *